US008065382B2

(12) United States Patent
Yokota

(10) Patent No.: US 8,065,382 B2
(45) Date of Patent: Nov. 22, 2011

(54) NETWORK SYSTEM, ELECTRONIC EQUIPMENT TERMINAL, SERVER APPARATUS AND METHOD FOR DISTRIBUTING AND REPRODUCING THE CONTENTS

(75) Inventor: Teppei Yokota, Chiba (JP)

(73) Assignee: Sony Corporation (JP)

( * ) Notice: Subject to any disclaimer, the term of this patent is extended or adjusted under 35 U.S.C. 154(b) by 947 days.

(21) Appl. No.: 10/832,857

(22) Filed: Apr. 27, 2004

(65) Prior Publication Data
US 2005/0021607 A1 Jan. 27, 2005

(30) Foreign Application Priority Data
May 2, 2003 (JP) ................................ P2003-127064

(51) Int. Cl.
G06F 15/16 (2006.01)
(52) U.S. Cl. ........ 709/217; 709/203; 709/231; 709/247; 707/999.01
(58) Field of Classification Search .................. 709/203, 709/217, 219, 231, 247, 246; 707/999.01
See application file for complete search history.

(56) References Cited

U.S. PATENT DOCUMENTS

| 5,724,526 | A  | * | 3/1998 | Kunita .......................... 704/277 |
| 6,012,091 | A  | * | 1/2000 | Boyce .......................... 709/219 |
| 6,891,932 | B2 | * | 5/2005 | Bhargava et al. .......... 379/88.02 |
| 6,999,791 | B1 | * | 2/2006 | Ishikura et al. .............. 455/557 |
| 7,191,135 | B2 | * | 3/2007 | O'Hagan ................... 704/270.1 |
| 2002/0002039 | A1 | * | 1/2002 | Qureshey et al. ............. 455/344 |
| 2002/0068558 | A1 | * | 6/2002 | Janik ............................. 455/422 |
| 2002/0073171 | A1 |   | 6/2002 | McDowall et al. |
| 2002/0095293 | A1 | * | 7/2002 | Gallagher et al. ............ 704/270 |
| 2003/0018975 | A1 |   | 1/2003 | Stone |
| 2003/0023444 | A1 | * | 1/2003 | St. John .................... 704/270.1 |
| 2003/0074398 | A1 | * | 4/2003 | Matsuo ........................ 709/203 |
| 2003/0109944 | A1 | * | 6/2003 | Ritz et al. ......................... 700/94 |
| 2003/0135867 | A1 | * | 7/2003 | Guedalia ....................... 725/126 |
| 2003/0188005 | A1 | * | 10/2003 | Yoneda et al. ................ 709/231 |
| 2004/0196826 | A1 | * | 10/2004 | Bao et al. ...................... 370/352 |

FOREIGN PATENT DOCUMENTS

| JP | 04-312316 | 11/1992 |
| JP | 10-336548 | 12/1998 |
| JP | 2000-250574 | 9/2000 |
| JP | 2000299854 A * | 10/2000 |
| JP | 2000-331075 | 11/2000 |
| JP | 2001-343979 | 12/2001 |

(Continued)

OTHER PUBLICATIONS

European Search Report EP 04252557, dated Jul. 4, 2011.

Primary Examiner — Oanh Duong
(74) Attorney, Agent, or Firm — Lerner, David, Littenberg, Krumholz & Mentlik, LLP

(57) ABSTRACT

A network system by which contents providing services over the Internet may be accepted in each room of a home includes a server apparatus and an electronic equipment terminal interconnected over a LAN. The server apparatus may be connected to the Internet. The electronic equipment terminal transmits a command requesting contents to be acquired over the Internet to the server apparatus via a communication interface and the LAN and receives digital data of the decoded result of the contents transmitted from the server apparatus over the LAN. The electronic equipment terminal performs audio reproduction and/or video display by an audio reproducing unit and/or a video display unit.

18 Claims, 14 Drawing Sheets

FOREIGN PATENT DOCUMENTS

| | | |
|---|---|---|
| JP | 2002-033832 | 1/2002 |
| JP | 2002-101460 | 4/2002 |
| JP | 2002-132646 A | 5/2002 |
| JP | 2002-152875 | 5/2002 |
| JP | 2002-311962 | 10/2002 |
| JP | 2002-318720 | 10/2002 |
| JP | 2003-005949 | 1/2003 |
| JP | 2003-009032 | 1/2003 |

\* cited by examiner

| | ALBUM NUMBER | TRACK NUMBER |
|---|---|---|
| JUKEBOX | ALBUM NAME | TITLE OF MUSIC AIR |
| INTERNET RADIO | NAME OF BROADCASTING STATION | PROGRAM NAME |
FIG.2
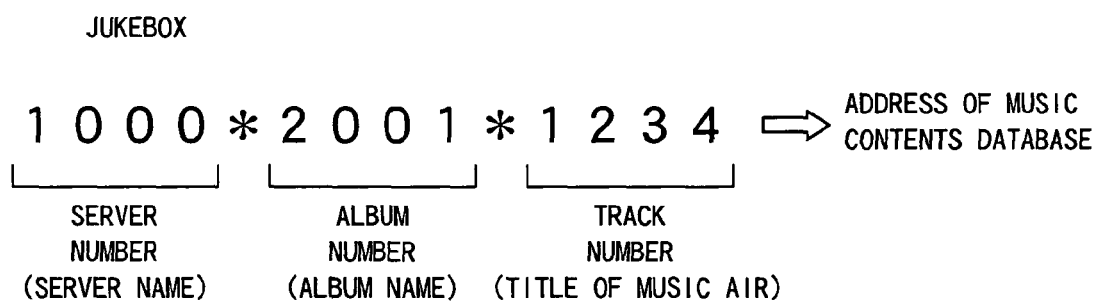
FIG.3A
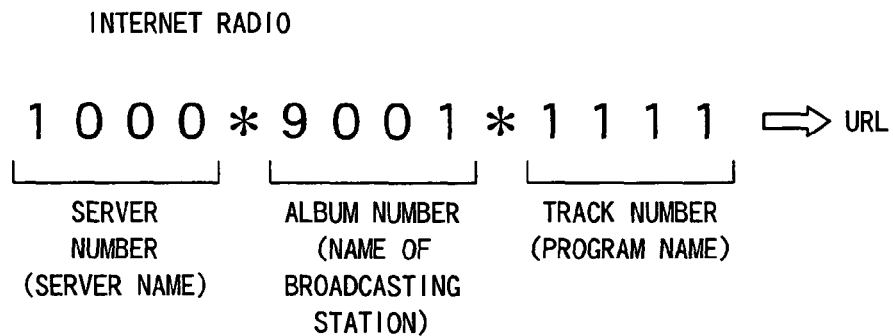
FIG.3B

NETWORK SYSTEM, ELECTRONIC EQUIPMENT TERMINAL, SERVER APPARATUS AND METHOD FOR DISTRIBUTING AND REPRODUCING THE CONTENTS

BACKGROUND OF THE INVENTION

1. Field of the Invention

This invention relates to a network system for allowing acceptance of contents providing services, such as Internet radio, over the Internet. This invention also relates to an electronic equipment terminal and a server apparatus used for such system.

This application claims priority of Japanese Patent Application No.2003-127064, filed in Japan on May 2, 2003, the entirety of which is incorporated by reference herein.

2. Description of Related Art

There are a wide variety of contents providing services over the Internet. As one of these services, there is known an Internet radio in which a radio broadcasting station broadcasts audio contents over the Internet.

If desired to receive and hear the contents of this Internet radio, the Internet account, software for browser, software for processing the audio information, loudspeaker, tuner and a unit for sound volume adjustment, are required. The structure of this sort of the Internet radio receiving system is disclosed in Patent Publication 1 (Japanese Laying-Open Patent Kohyo 2003-502887).

In the receiver system, shown in the above Patent Publication 1, the appearance of a user interface is designed after a radio broadcast receiver. The receiver system in the above Patent Publication 1 is a stand-alone type device or a device constructed with a personal computer as center. An exemplary structure of the latter system is shown in FIG. 15 hereof.

Referring to FIG. 15, this receiver system is made up by a radio box 10, forming a user interface, and a personal computer system 20. The radio box 10 and a personal computer 21 of the personal computer system 20 are interconnected over a cable 11 by USB (Universal Serial Bus) or SCSI (Small Computer System Interface).

The radio box 10 includes a volume knob, a tuning knob in case of a radio broadcast receiver, and a display for demonstrating the selected station or the frequency. A numerical figure for the specified frequency is demonstrated on a display by acting on the tuning knob. Here, the specified frequency is used for identifying the broadcasting station of the Internet radio.

In the personal computer system 20, a display 22, a pair of loudspeakers 23, 23 and a modem 24 are connected to the personal computer 21. The modem 24 is connected over a telephone network 25 to the Internet 12.

In the personal computer 21, the information of a table showing the association of the URL (Universal Resource Locator) of the Internet radio station and the frequency specified by the radio box 10 is stored and saved in a memory.

In case a radio listener user acts on the tuning knob of the radio box 10 to specify the frequency, the frequency information is delivered to the personal computer 21 over the communication cable 11. The personal computer 21 refers to the information of the association table saved in the memory to detect the URL of the specified Internet radio station. The user accesses the Internet radio station over the Internet 12, using the URL, to receive the radio broadcast data. The so received data is decoded to reproduce audio signals. The so reproduced audio signals are transduced by the loudspeakers 23, 23 into the sound, which then is radiated.

With this receiving system, the user may enjoy the Internet radio with the same feeling as with the conventional apparatus for receiving radio broadcast electrical waves.

Patent Publication 1

Patent Gazette of Japanese Laying-Open Patent Kohyo 2003-502887

However, with the receiver system, disclosed in the above Patent Publication 1, the Internet radio can be heard only in a room where the personal computer system 20 is installed, while such a use form in which the user moves from one room to another to hear the Internet radio as with the so-called portable radio set is not possible with ease.

With the above receiver system, the user can hear the Internet radio, as he/she moves from one room to another, provided that a modular jack connectable to the telephone network is mounted in each room, such that the personal computer system 20 in its entirety is moved. However, movement of the personal computer system 20 in its entirety is unrealistic and impractical.

It may be contemplated to install the system of FIG. 15 in each room. However, if the function of the Internet radio system is to be implemented, it is necessary to provide a circuit for communication over the Internet, a Web decoding function and the circuitry for audio output. Moreover, a ROM (read-only memory) and a RAM (random-access memory), which are similarly needed in addition to a high-speed CPU (central processing unit), are floor-space-consuming, thus raising the cost and the expenses to be sustained by the user.

SUMMARY OF THE INVENTION

It is therefore an object of the present invention to provide a network system which is less costly and which enables a variety of contents, such as contents provided by the Internet, may be reproduced e.g. in each room of a home.

For accomplishing the above object, the network system according to claim 1 is such a network system in which a server apparatus and an electronic equipment terminal are interconnected over a network, such as LAN (Local Area network), and in which the electronic equipment terminal includes a terminal transmitting unit configured to transmit a command requesting contents over the network to the server apparatus, and a reproducing unit configured to reproduce the digital data of the contents sent from the server apparatus over the network. The server apparatus includes a server transmitting unit which, on receipt of the command from the electronic equipment terminal, the digital data of the requested contents to the electronic equipment terminal over the network.

The network system according to claim 4 is such a network system in which the server apparatus includes a data receiving unit configured to acquire digital data of the contents over the network responsive to the command from the electronic equipment terminal. The digital data is sent over the network to the electronic equipment terminal.

With the network system of claims 1 or 4, the electronic equipment terminal sends a command requesting the contents over the network to the server apparatus. In particular, with the network system of claim 4, the electronic equipment terminal sends a command requesting the contents, to be acquired over the Internet, over the network to the server apparatus.

With the network system of claim 4, the server apparatus which has received the command accesses the Internet responsive to the command to acquire the requested contents from the Internet. With the network system of claim 1 or 4, the server apparatus which has received the command decodes the data of the acquired contents to send the digital data of the decoded result over the network to the electronic equipment terminal.

The electronic equipment terminal receives the digital data of the decoded result of the contents, sent from the server apparatus over the network, and performs audio reproduction and/or video display based on the digital data.

Hence, the relatively costly components, such as the circuitry of the communication function with the Internet for implementing the function of the Internet radio system, the Web deciphering function, high-speed CPU, a large capacity ROM or RAM, are provided in the server apparatus, so that the electronic equipment terminal needs only the function of connection to the network, a function of requesting a command to the server apparatus, and audio reproducing means and/or video display means for generating the reproduced voice and/or the reproduced picture from the digital data of the decoded results, and hence the electronic equipment terminal may be inexpensive.

Thus, by installing a server apparatus in a room provided with a modular jack connected to for example the telephone network, by providing a network connection unit for connection to the network in each room, to construct a domestic LAN system and by connecting the electronic equipment terminal to the network connection unit in each room, it is possible to construct an inexpensive domestic LAN system.

With the network system of claim 6, the electronic equipment terminal includes a microphone, and the command sent to the server apparatus is formed by digital data of the user's voice as picked up by the microphone. The server apparatus includes a voice recognition unit configured to recognize the digital data of the user's voice, as voice, received over the network, and identifies the command by the result of voice recognition.

With the network system of claim 6, the user of the electronic equipment terminal utters a command to be sent to the server apparatus over the microphone by way of voice input. The electronic equipment terminal sends the command by the voice as digital data to the server apparatus.

The server apparatus recognizes the voice data, as voice, using a voice recognition unit, to identify the input command, and acquires the contents, as requested by the command, from e.g. the Internet, to transmit the decoded result to the electronic equipment terminal.

With the network system of claim 6, the user advantageously does not have to input a command using an operating unit provided to the electronic equipment terminal.

According to the present invention, relatively costly components are provided on the server apparatus, in a concentrated fashion, so that the electronic equipment terminal may be of a simpler structure in which it is only necessary to change the preexisting electronic equipment, and hence it is possible to construct a relatively inexpensive network system in which the contents providing services over the network may be accepted in each room of a home.

BRIEF DESCRIPTION OF THE DRAWINGS

FIG. 2 illustrates the contents provided by an embodiment of the present invention.

FIG. 3 illustrates an example of a command used in an embodiment of the present invention.

DESCRIPTION OF THE PREFERRED EMBODIMENTS

Figure 1:
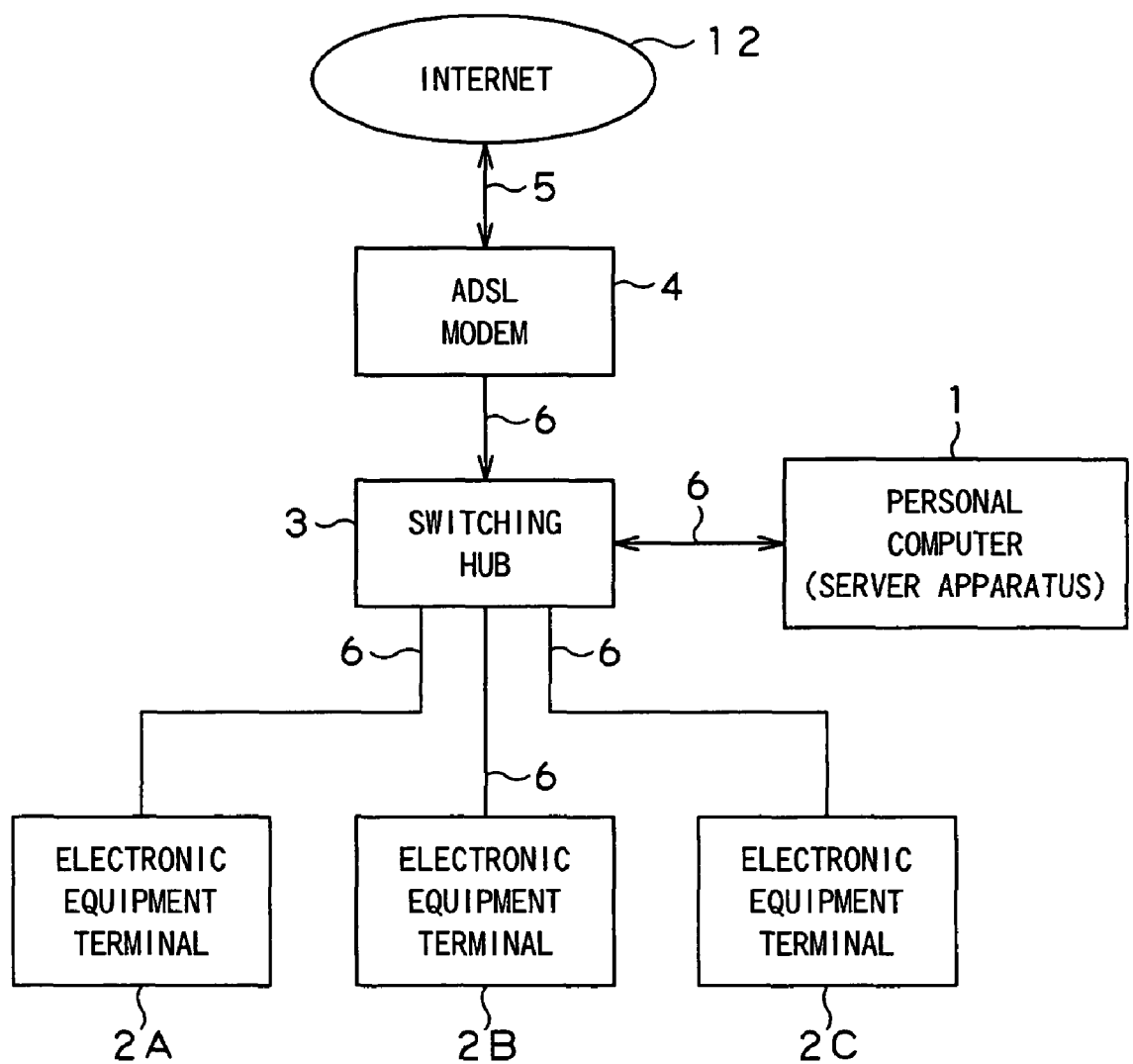
FIG. 1 illustrates the schematics of a network system embodying the present invention.

Referring to the drawings, a network system, embodying the present invention, is now explained. The embodiment, now explained, is directed to a case in which the contents are acquired over the Internet and in which the contents acquired are those of an Internet radio.

FIG. 1 shows the overall network system of the present embodiment. A personal computer 1, electronic equipment terminals 2A to 2C and an ADSL (Asymmetric Digital Subscriber line) modem 4 are connected to a switching hub 3 to form a so-called home LAN (Local Area Network). The ADSL modem 4 is connected to the Internet 12 over the telephone network 5.

The network system of the present embodiment uses Ethernet (registered trademark), for example, as LAN, and a LAN cable 6 for Ethernet (registered trademark) interconnects the switching hub 3 and the personal computer 1, while interconnecting the switching hub 3 and the electronic equipment terminals 2A to 2C and also interconnecting the switching hub 3 and the ADSL modem 4.

The personal computer 1 forms a server apparatus. Hence, the personal computer 1 is termed a PC server in the following explanation. This PC server 1 at least includes a function of exchanging commands and digital data of contents with the electronic equipment terminals 2A to 2C through the switching hub 3, a function of communicating with the Internet 12 through the switching hub 3 and the ADSL modem 4, and a Web decoding function.

Additionally, the PC server 1 of the present embodiment not only has a function of providing the contents of the Internet radio to the electronic equipment terminals 2A to 2C, but has a function of a jukebox.

The function of the PC server 1 of providing the contents of the Internet radio to the electronic equipment terminals 2A to 2C is the function of acquiring the contents of the Internet radio over the Internet 12 responsive to a command from the electronic equipment terminals and of decoding the so acquired contents data to furnish the so decoded data to the electronic equipment terminals.

For the function of the jukebox, the PC server 1 includes a database of music contents, and sends the music contents requested by a command from the electronic equipment terminals to the electronic equipment terminals from the database.

Additionally, the PC server 1 of the present embodiment is configured for recognize the voice of the user's command by voice from the electronic equipment terminals to carry out the processing corresponding to the results of the voice recognition. The detailed structure of the PC server 1 will be explained subsequently.

Each of the electronic equipment terminals 2A to 2C at least includes a connector, connected to the LAN cable 6, a communication interface for LAN (herein Ethernet, a registered trademark), a function of accepting from the user a command input requesting the contents to be acquired over the Internet, a function of sending the accepted command to the PC server 1, and audio reproducing means for acquiring a voice output from digital data of the decoded results of the contents sent from the PC server responsive to this command.

In the present embodiment, the audio reproducing means is made up by loudspeakers enclosed within the main body units of the electronic equipment terminals 2A to 2C. However, the audio reproducing means may be exterior loudspeakers connected to audio output terminals provided to the main body units of the electronic equipment terminals 2A to 2C, or may also be a headphone system connected to a headphone terminal provided to the main body units of the electronic equipment terminals.

In the present embodiment, the electronic equipment terminals 2A to 2C exploit pre-existing electronic equipment for audio reproduction, such as CD (Compact Disc) player or a Mini-Disc (MD) player, fitted with the function of a radio receiver, or a component stereo system, in order to reduce the cost to a possible minimum.

That is, each of the electronic equipment terminals 2A to 2C is of a structure corresponding to that of the above-described pre-existing electronic equipment for audio reproduction added by a function of connecting the equipment to the LAN and a function of sending a command to the PC server 1 and receiving the digital data from the PC server to reproduce the digital data by the audio reproducing means the equipment owns. A detailed illustrative structure of the electronic equipment terminal will be explained subsequently.

In the present embodiment, the communication between the PC server 1 and each of the electronic equipment terminals 2A to 2C uses the HTTP (HyperText Transfer Protocol) in accordance with TCP/IP (Transmission Control Protocol/Internet Protocol). Although the UDP (User Datagram Protocol) may be used in order to carry out data transmission, TCP/IP is used herein for reliability.

Since the PC server 1 and the electronic equipment terminals 2A to 2C are provided with MAC (Media Access Control) address, the PC server 1 has registered therein the MAC addresses of the electronic equipment terminals 2A to 2C connected to the LAN. When the decoded data of the contents are sent to the electronic equipment terminals 2A to 2C, the PC server 1 first checks to see that these electronic equipment terminals 2A to 2C are the terminals registered therein and subsequently sends out the data.

In the present embodiment, the PC server 1 supervises each music air by an album-based hierarchical structure in a CD or MD (registered trademark) in the database for music contents for the jukebox function. Moreover, in the present embodiment, both the contents of the Internet radio and the contents of the jukebox function are unified by the concepts of the album and the track and may be accessed by serial numbers.

In the present embodiment, shown in FIG. 2, the album names of the music contents database of the jukebox are associated with the album numbers, while the titles of the music airs are associated with the track numbers. In the case of the contents of the Internet radio, the names of the broadcasting stations are associated with the album numbers, while the program names are associated with the track numbers.

Consequently, a contents request command from the electronic equipment terminal to the PC server 1 includes the album number and the track number. In the present embodiment, the contents are supervised by the server names, album names and the track numbers, in consideration that plural PC servers may be provided on the LAN.

In the PC server 1, the correspondence between a command made up of the above number information and the address information for reading out the requested music air from the music contents database is stored and supervised by a memory, in connection with the jukebox function, whilst the correspondence between a command made up of the above number information and the URL (Uniform Resource Locator) address for accessing the broadcast program of the broadcasting station as requested, is stored and supervised by a memory, in connection with the Internet radio.

The command from the electronic equipment terminals 2A to 2C is in the form of a server number*album number*track number, as shown for example in FIGS. 3A and 3B. As will be explained later, the server number is accorded from the PC server 1 to the electronic equipment terminals 2A to 2C, when the electronic equipment terminals 2A to 2C first access the PC server 1. The electronic equipment terminals 2A to 2C memorize the server number and, when the contents request command is sent to the PC server 1, the electronic equipment terminals 2A to 2C automatically append the command to the PC server 1. Consequently, the user enters the album number and the track number as command numbers.

It is noted that '*', performing the role of a separator for separating the respective numbers, may be directly entered by the user. However, if the respective numbers of the digits of the album number and the track number are fixed, it is possible for the electronic equipment terminals 2A to 2C to accept number inputs from the user in a preset sequence, such as in the sequence of the album numbers→track number, and to append the numbers automatically.

Since the symbol '*' need not be entered in the latter case, it is sufficient for the electronic equipment terminals 2A to 2C to be provided with the function of accepting the number inputs from the user as means for receiving the command inputs from the user.

Meanwhile, if the numbers of digits of the server number, album number and the track number are fixed, and the sequence of these numbers is fixed to, for example, the server number→album number→track number, the PC server 1 is able to identify the respective numbers, and hence the separator '*' may be dispensed with.

The jukebox function may be demarcated from the Internet radio function by, for example, the album number. For example, the numbers of from 1000 to 4999 are allocated for the album names for the jukebox, while the numbers of from 5000 to 9999 are allocated for the names of the broadcasting stations of the Internet radio. It is noted that the numbers of from 0000 to 0999 are allocated for other commands.

Thus, the number string of FIG. 3A specifies a particular music air of a particular album name of a jukebox, as an example. This number string corresponds to a memory address of the music contents database. The number string of FIG. 3B specifies a particular broadcast program of a particular broadcasting station of the Internet radio. This number string corresponds to a URL address on the Internet. The PC server 1 memorizes these correspondence tables.

[Illustrative Hardware Structure on the PC Server 1]

Figure 4:
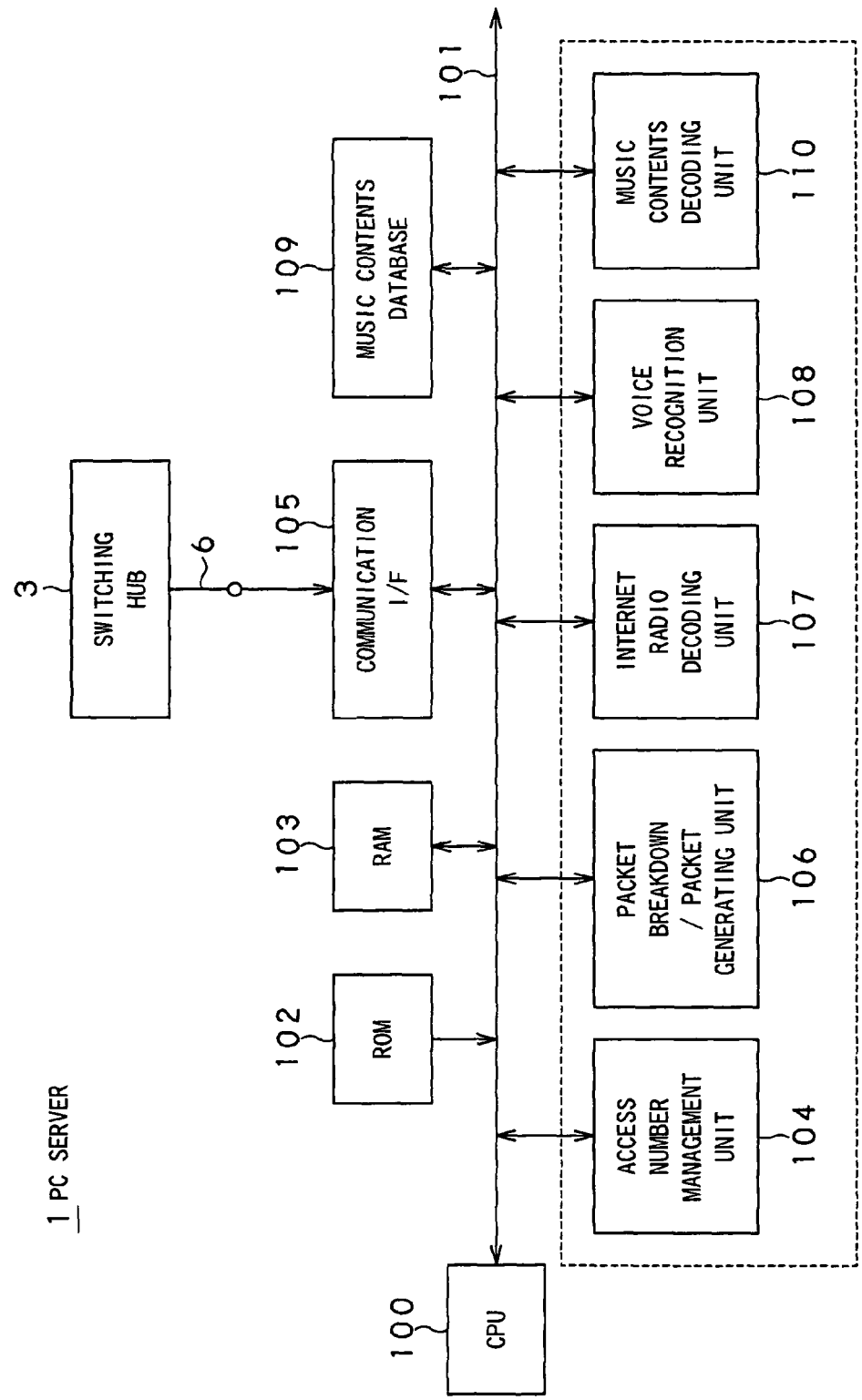
FIG. 4 is a block diagram showing an illustrative structure of a server apparatus embodying the present invention.

In FIG. 4, showing an illustrative structure of the PC server 1, a ROM 102, a RAM 103, an access number management unit 104, a communication interface 105 for LAN (herein Ethernet (registered trademark)), a packet breakdown/packet generating unit 106, an Internet radio decoding unit 107, a voice recognition unit 108, a music contents database 109 and a music contents decoding unit 110 are connected to a CPU 100 over a system bus 101.

Meanwhile, with increase in the operating speed of the CPU, the access number management unit 104, packet breakdown/packet generating unit 106, Internet radio decoding unit 107, voice recognition unit 108, music contents database 109 and the music contents decoding unit 110, shown within a broken line rectangle, may be implemented by the software.

The access number management unit 104 includes the management information for supervising the correspondence between the command number and the memory address of the music contents database 109 and the correspondence between the command number and the URL address of the Internet radio, as explained using FIG. 2 and FIGS. 3A and 3B. As the management information, the table of correspondence between the command number and the memory address or URL address, for example, is used.

The packet breakdown/packet generating unit 106 performs the processing of breaking down the packet taken in from the LAN to take out e.g. command data therefrom, and packetizing digital audio data to be sent out to LAN.

When the requested program data has been taken in from the Internet radio station over the Internet 12 to the PC server 1, the Internet radio decoding unit 107 decodes the so taken-in program data to output digital audio data. The digital audio data, representing the decoded results, may be restored by the D/A converter into analog audio signals, and may, for example, be PCM audio data.

The voice recognition unit 108 serves for voice recognition of a voice command from the electronic equipment terminals 2A to 2C. That is, in the present embodiment, a retrieval command, such as an album name, title of a music air, the name of the Internet radio station or the program name, is input by a user as voice command over a microphone in the electronic equipment terminals 2A to 2C, as later explained, to request retrieval of the PC server 1. The aforementioned command may also be input as voice by the user over the microphone to give a voice command. Since the speech command is sent as a command to the PC server 1 from the electronic equipment terminals 2A to 2C, the voice recognition unit 108 of the PC server 1 recognizes the voice command to verify the command contents.

The music contents database 109 is a storage site where the music contents for the jukebox function are stored, as previously explained. The database is made up by e.g. a hard disc device, an optical disc device or a semiconductor memory. In this music contents database 109, there are stored contents, specified by the album names and titles of the music airs, in association with the album names and titles of the music airs. In the present embodiment, the music contents are stored compressed in order to reduce the storage capacity.

The music contents decoding unit 110 decompress the compressed music contents, read out from the music contents database 109, to output digital audio data.

[Illustrative Hardware Structure of Electronic Equipment Terminal]

Figure 5:
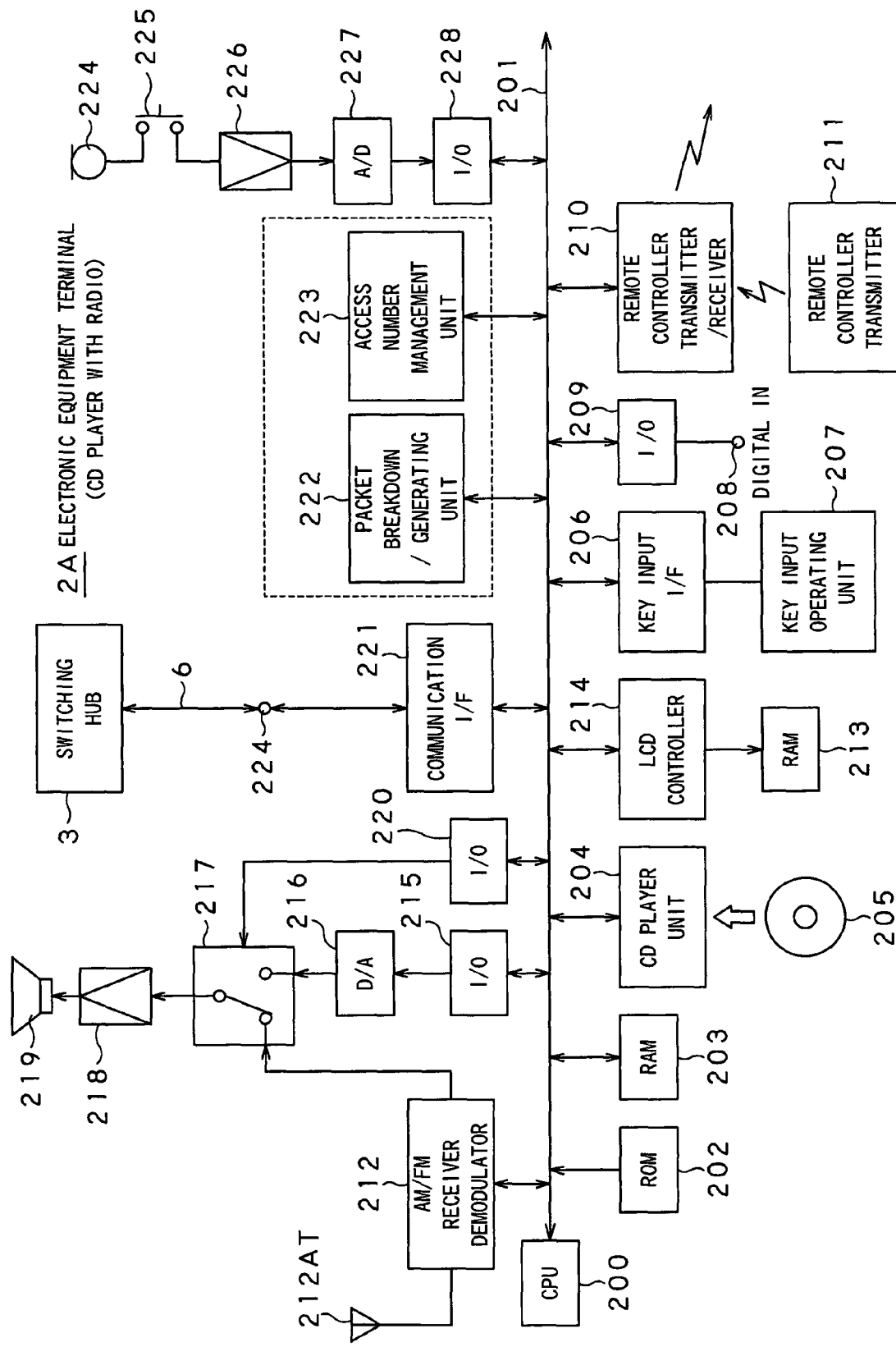
FIG. 5 is a block diagram showing an illustrative structure of an electronic equipment terminal embodying the present invention.

FIG. 5 shows an illustrative structure of an electronic equipment terminal. Specifically, this figure shows the electronic equipment terminal 2A, having the structure of a CD player fitted with a radio receiver function.

Specifically, the electronic equipment terminal 2A includes, connected to a CPU 200 over a system bus 201, a ROM 202, a RAM 203, a CD player unit 204 for reproducing a CD 205, a key input interface 206, connected to a key input interface 207, an I/O port 209, connected to a digital input terminal 208, a remote controller transmitter/receiver 210 for receiving remote control signals from a remote controller transmitter 211 and for transmitting remote control codes, under a command from a server apparatus, depending on the particular application, an AM/FM receiver demodulator 212, an LCD controller 214, connected to an LCD (liquid crystal display), an I/O port 215 for outputting audio signal, I/O ports 220 and 228, a communication interface 221, a packet breakdown/generating unit 222 and an access number management unit 223.

Meanwhile, the packet breakdown/generating unit 222 and the access number management unit 223 are sometimes implemented by software, as shown in a broken-line rectangle in FIG. 5.

In the present embodiment, the key input interface 207 and the remote controller transmitter 211 include a mode changeover key, by means of which the electronic equipment terminal 2A may be switched to an AM radio receiving mode, an FM radio receiving mode, a CD reproducing mode, an Internet radio mode, a jukebox mode or to a voice retrieval mode. This mode changeover key may be formed by plural keys for the respective modes, or by a sole key which may be acted on for changing over to the respective modes.

In the AM radio receiving mode and in the FM radio receiving mode, a station selection control signal, corresponding to the user's tuning operation via key input interface 207 or remote controller transmitter 211, is sent to the AM/FM receiver demodulator 212, under control by the CPU 200. The AM/FM receiver demodulator 212 selects and receives the broadcasting station, corresponding to the user's selection, from the broadcast electrical waves, received over an antenna 212AT, to reproduce the analog audio signals of the program of the broadcasting station. The analog audio signals are supplied via a switching circuit 217 and an amplifier 218 to a loudspeaker 219 for acoustically reproducing the radio program.

In the CD reproducing mode, when a CD is loaded on the CD drive 204 and a user's CD replay command operation via key input interface 207 or remote controller transmitter 211 is entered, the musical air of the track number as specified is read out from the CD drive 204 and decoded. The digital audio signals, obtained on decoding, are sent to the I/O port 215.

The digital audio signals, output from the I/O port 215, are supplied to a D/A converter 216 where the signals are restored to analog audio signal which are then sent over the switching circuit 217 and the amplifier 218 to the loudspeaker 219 for audio reproduction.

It is noted that, by a changeover control signal from the I/O port 215, the switching circuit 217 is changed over to the state shown during the AM radio receiving mode and during the FM radio mode receiving mode, while being changed over to a state reversed from the state shown during CD replay, the Internet radio mode, in which contents providing services are accepted from the PC server 1, jukebox mode and the voice retrieval mode.

The electronic equipment terminal 2A of the present embodiment differs from the routine radio/CD player in that the communication interface 221 for LAN, herein the Ethernet (registered trademark), packet breakdown/generating unit 222 and the access number management unit 223 are connected to the system bus 201. A terminal 224 connected to the communication interface 221 is formed by a connector for LAN.

The packet breakdown/generating unit 222 operates under control by the CPU 200 to break down a packet, taken in from the LAN, to extract e.g. digital audio data, sent from the PC server 1, to transfer the so extracted data to the I/O port 215, or to packetize the command data to be sent to LAN.

The access number management unit 223 includes a storage unit in which there are stored the correspondence between the server names and the server numbers and the correspondence between the names of the broadcasting stations and the album names or the command names. When the command name is entered via key for the Internet radio mode or the jukebox mode, the inputting of the command name is allowed only within the range of the command numbers allocated as command numbers for the Internet radio or the jukebox.

In the present embodiment, the electronic equipment terminal 2A has the command number retrieval search function of sequentially demonstrating the command number, the name of the broadcasting station or the album name, on a display of the LCD 213 to retrieve the command number. That is, in this command number search, the command numbers corresponding to the broadcasting stations stored in the storage unit of the access number management unit 223 are sequentially read out and displayed on the LCD 213. The names of the broadcasting stations may be displayed simultaneously. The user then checks the display to select the broadcasting station or the album he/she desires to access.

In the voice retrieval mode, the user utters the retrieving command by voice to enter the retrieval command, as described above. In the present embodiment, the inputting of the retrieval command by voice is by a PTT (push-to-talk) system in which the voice input is possible only during pressing of the pushbutton. The pressing of the pushbutton is notified to the CPU 200 via I/O port 228.

To this end, in the present embodiment, a microphone 224 is provided in the electronic equipment terminal 2A, while a pushbutton key for PTT is provided in the key input operating unit 207. The voice signals from the microphone 224 are supplied to an amplifier 226 through a switch circuit 225 which is turned on solely during the time the pushbutton key for PTT is pressed. The voice signals are sent through the amplifier 226 to an A/D converter 227 for conversion into digital audio signals, which digital audio signals are then sent over the I/O port 228 to the system bus 201.

The digital audio signals, thus entered to the system bus 201, are packetized by the packet breakdown/generating unit 222, under control by the CPU 200, and are sent out as a packet of the voice command via communication interface 221 to the PC server 1.

In the present embodiment, the PC server 1 sends out to the electronic equipment terminals 2A to 2C not only the digital audio signals but also text data, such as the titles of music airs or the artist's names, in the case of a jukebox, or the names of broadcast programs, in the case of the Internet radio, if there are any such text data.

Hence, the electronic equipment terminal 2A has the function of converting packet data, sent from the PC server 1, if the packet data is the text data, into data of the form that may be displayed on the LCD 213, and the function of displaying the names of the music airs of the jukebox, artist's names or the names of the broadcast programs of the Internet radio, on the LCD 213. That is, the program for realizing this function is stored in the ROM 202.

Although FIG. 5 shows the case of the electronic equipment terminal 2A formed as a CD player fitted with the radio receiving function. Of the components shown in FIG. 5, command inputting means or the audio reproducing means, such as the CPU 200, system bus 201, ROM 202, RAM 203, communication interface 221, packet breakdown/generating unit 222, key input interface 207, remote controller transmitter 211 or the microphone 224, are provided similarly on other electronic equipment terminals 2B and 2C.

It should be noted that both the key input operating unit 207 on one hand and the remote controller transmitter 211 and the remote controller transmitter/receiver 210 on the other hand need not necessarily be provided, such that, if it is only necessary to receive only the operating command, it is sufficient if only one is provided. In an application wherein the operational command is transmitted responsive to a request from a server apparatus, the remote controller transmitter/receiver 210 is unnecessary.

As for audio reproducing means, the loudspeaker of the electronic equipment terminal is not mandatory, as discussed above, such that it may be only necessary to provide a voice signal output terminal. However, a loudspeaker or a headphone, connected to the voice signal output terminal, is necessary insofar as the network system is concerned.

[Processing Operation in the Electronic Equipment Terminal]

The processing operation of the electronic equipment terminal, constructed as described above, is now explained by referring to the flowcharts of FIGS. 6 to 10. The electronic equipment terminal, taken as an example for explanation, is the electronic equipment terminal 2A shown in FIG. 5. Meanwhile, the operations shown in FIGS. 6 to 10, are the processing operations initiated on power up of the electronic equipment terminal 2A, and are carried out mainly by the CPU 200.

Figure 6:
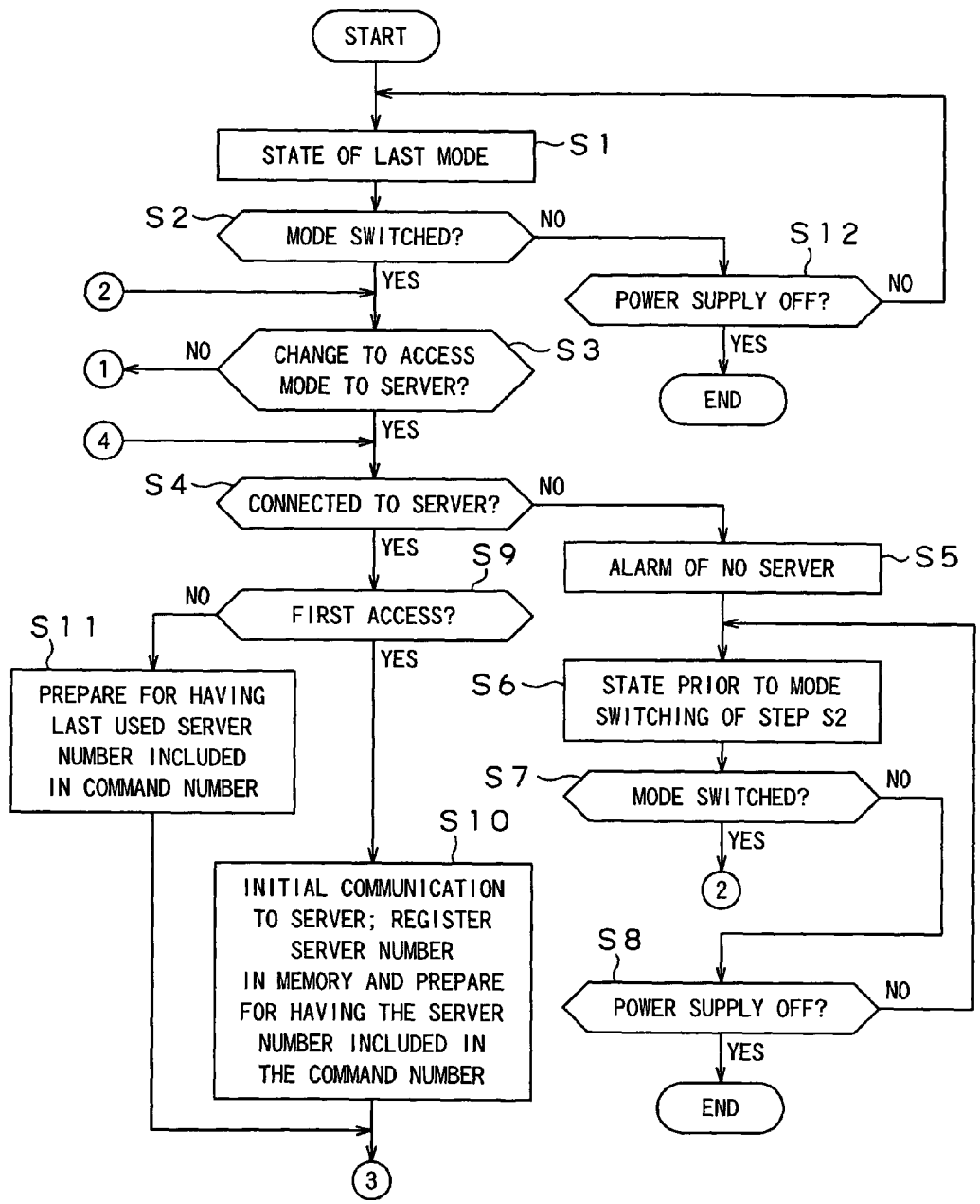
FIG. 6 depicts a portion of a flowchart for illustrating the processing operation in the electronic equipment terminal embodying the present invention.
Figure 7:
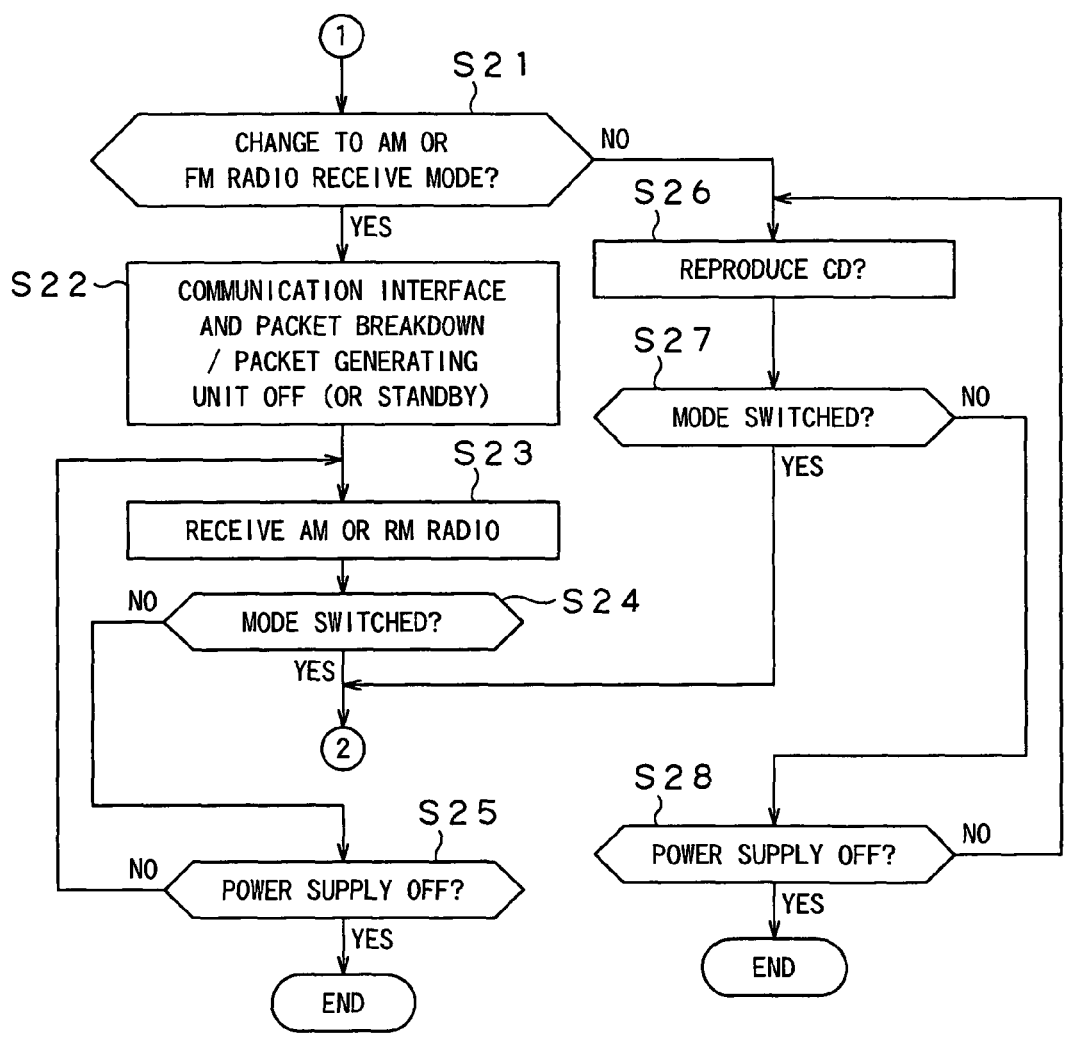
FIGS. 7 to 11 similarly depict respective portions of the flowchart for illustrating the processing operation in the electronic equipment terminal embodying the present invention.

Referring to FIG. 6, the state of the last mode is set, on power up (step S1). The last mode is the AM radio receiving mode, FM radio receiving mode, jukebox mode, Internet radio mode or the voice retrieval mode, whichever prevailed on directly previous power down, that is, the mode which prevailed last time. At an initial time when the power supply to the electronic equipment terminal 2A is turned on, the AM radio receiving mode or the FM radio receiving mode, for example, is set.

From the state of the last mode, it is checked whether or not the mode changeover operation has occurred (step S2). If it is determined that no mode changeover operation has occurred, the CPU 200 verifies whether or not the power supply has been turned off (step S12). If it is determined that the power supply has not been turned off, the CPU returns to the step S1 and, if otherwise, the processing comes to a close.

If it is determined in the step S2 that the mode changeover operation has occurred, the CPU 200 checks to see whether or not the mode has been changed to the jukebox mode, Internet radio mode or to the voice retrieval mode, as the mode of access to the PC server 1 (step S3). If it is determined in this step S3 that changeover to the access mode to the PC server 1 has not occurred, the CPU 200 checks to see whether or not the mode has been changed to the AM radio receiving mode or to the FM radio receiving mode (step S21 of FIG. 7).

If it is determined that the input operation for changing the mode to the AM radio receiving mode or to the FM radio receiving mode has been done, the CPU 200 halts the supply of the poser supply voltage to the communication interface 221 or to the packet breakdown/generating unit 222 to deenergize these circuits. Or, the CPU 200 does not halt the supply of the poser supply voltage to these circuits, but renders these circuits in an inoperative state (standby state) (step S22). The reason for doing this is to prevent the noise intrusion from LAN circuitry relevant to communication during the time of the AM radio receiving mode or the FM radio receiving mode.

The CPU 200 exercises control for sending out a control signal, matched to the user's tuning (station selecting) operation via the key input operating unit 207 or the remote controller transmitter 211, to the AM/FM receiver demodulator 212, and for outputting a changeover control signal for switching the switching circuit 217 to the status shown, that is to the side of the AM/FM receiver demodulator 212, from the I/O ports 220, by way of performing the processing for receiving the AM radio broadcast program or the FM radio broadcast program.

The result is that, as a consequence of the reception processing by the AM/FM receiver demodulator 212, the analog audio signals, thus produced, are sent through the switching circuit 217 and the amplifier 218 to the loudspeaker 219, whereby the radio program, selected and commanded by the user, is acoustically reproduced (step S23).

The CPU 200 then checks to see whether or not the mode switching processing has been done from the state of the AM radio receiving mode or the FM radio receiving mode (step S24). If it is determined that no mode switching operation has been done, the CPU checks to see whether or not the power supply has been turned off (step S25). If it is determined that the power supply has not been turned off, the CPU returns to the step S23. If it is determined that the power supply has been turned off, the processing comes to a close.

If it is determined in the step S21 that the mode has been changed to the AM radio receiving mode or the FM radio receiving mode, the CPU verifies that the mode has been changed to the CD replay mode, and commands the CD player unit 204 to read out the music air of the specified track number to decode the so read out music air, as explained previously.

The CPU 200 also exercises control to output the digital audio signals from the CD player unit 204 from the I/O port 215 and to issue from the I/O port 220 a changeover control signal to set the switching circuit 217 to a state reversed from the state shown, that is, to the side of the D/A converter 216 (step S26).

Hence, the digital audio signals, decoded by the CD player unit 205, are sent from the I/O port 215 to the A/D converter 227 for conversion to analog audio signals, which analog audio signals are sent via switching circuit 217 and amplifier 218 to the loudspeaker 219 for audio reproduction.

The CPU 200 then verifies whether or not the mode switching operation has been done from the CD mode reproducing mode (step S27). If it is determined that no mode switching operation has occurred, the CPU verifies whether or not the power supply has been turned off (step S28). If it is determined that the power supply has not been turned off, the CPU returns to the step S26 to continue the CD replay mode. If it is determined that the power supply has been turned off, the processing comes to a close.

If it is determined in the steps S24 or S27 that the mode switching operation has occurred, the CPU returns to the step S3 of FIG. 6.

If it is determined in the step S3 of FIG. 6 that the operation of changing over to the access mode to the PC server 1 has been done, the CPU 200 turns the power supply for the communication interface 221 or the packet breakdown/generating unit 222 on, or sets the communication interface 221 or the packet breakdown/generating unit 222, so far in the standby state, to the operative state, to verify whether or not the electronic equipment terminal 2A remains connected to the PC server over LAN (step S4). The CPU 200 also switches the switching circuit 217 to a state reversed from the state shown.

If it is verified in this step S4 that the electronic equipment terminal 2A is not connected to the PC server 1, the CPU 200 causes this state of non-connection to the PC server 1 to be displayed on the LCD 213 by text or announced by voice over the loudspeaker 219 to issue an alarm to the user that the electronic equipment terminal 2A is not connected to the PC server 1 (step S5). The CPU then returns to the state of the mode prior to the check of the mode switching operation in the step S3 (step S6).

The CPU 200 then verifies whether or not the mode switching operation has been done (step S7). If the mode switching operation has not occurred, it is verified whether or not the power supply has been turned off (step S8). If it is determined that the power supply has not been turned off, the CPU returns to the step S6 to continue the state which prevailed prior to the mode switching operation in the step S2. If it is determined that the power supply has been turned off, the processing comes to a close. If it is determined in the step S7 that the mode switching operation has been done, the CPU reverts to the step S3.

If it is verified in this step S4 that the electronic equipment terminal 2A has been connected to the PC server 1, the CPU 200 verifies whether or not the present access is the first access to the PC server 1 over LAN (step S9). If it is determined that the access is the first access, the CPU has initial communication (initializing communication) with the PC server 1 (step S10).

In this step S10, the CPU 200 of the electronic equipment terminal 2A causes the server name to be stored as a number (server number) in a non-volatile memory unit, not shown, and makes preparations for having the server number included in a command number for the case of the Internet radio or the jukebox.

During this initial communication, the PC server 1 acquires the MAC address of the electronic equipment terminal 2A, and registers the address in a memory for supervision. This registration of the server number in the electronic equipment terminal by this initial communication may be carried out automatically, or the user's operation may be interposed in the PC server 1 and in the electronic equipment terminal 2A in the initial setting by way of performing the initial setting and registration.

If it is found in the step S9 that the access to the PC server 1 is not the first access, preparations are made for having the last used server number included in the command number for the Internet radio or the jukebox (step S11). It is noted that the last used server number is stored in the non-volatile memory.

Figure 8:
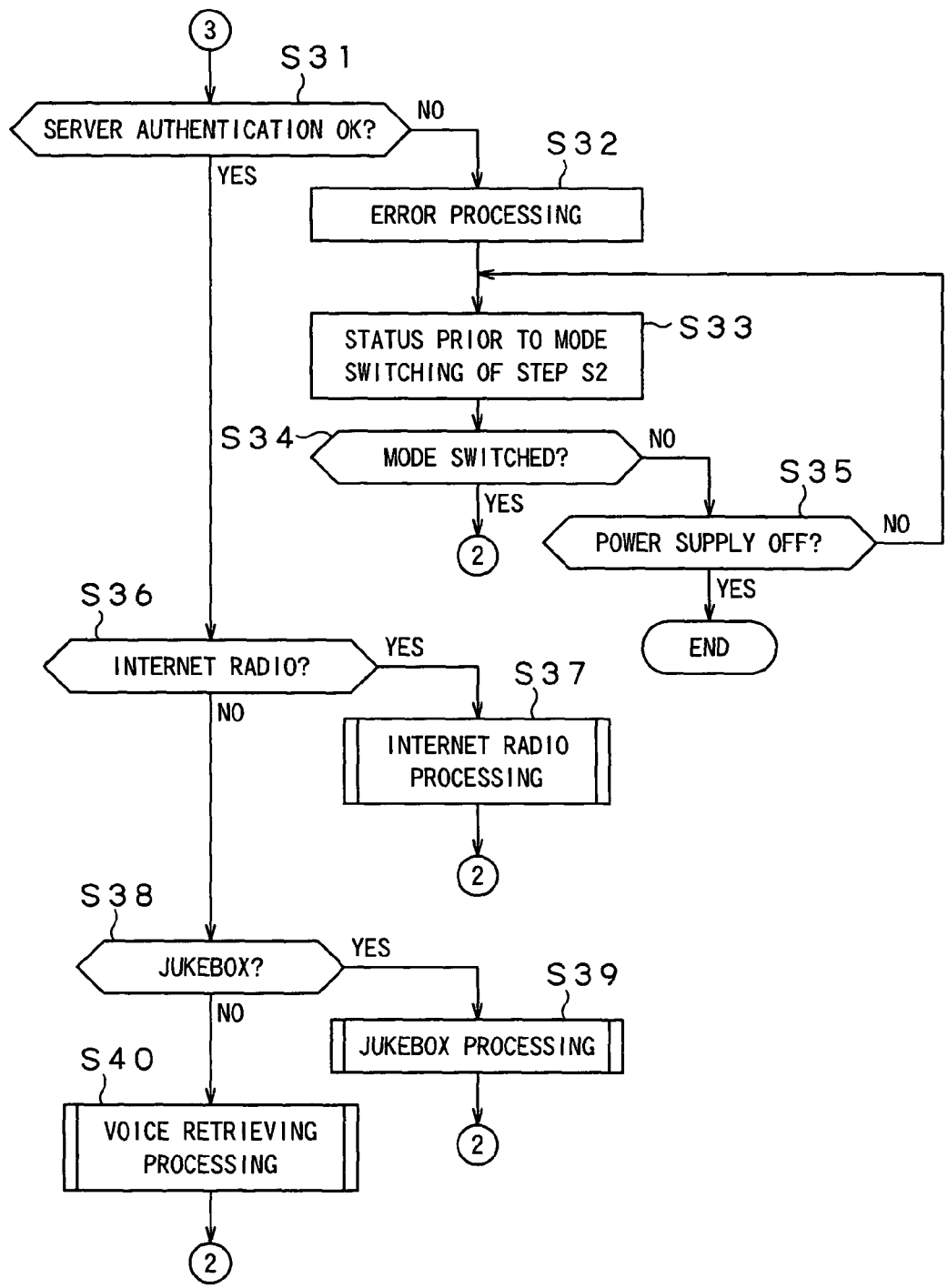
Figure 9:
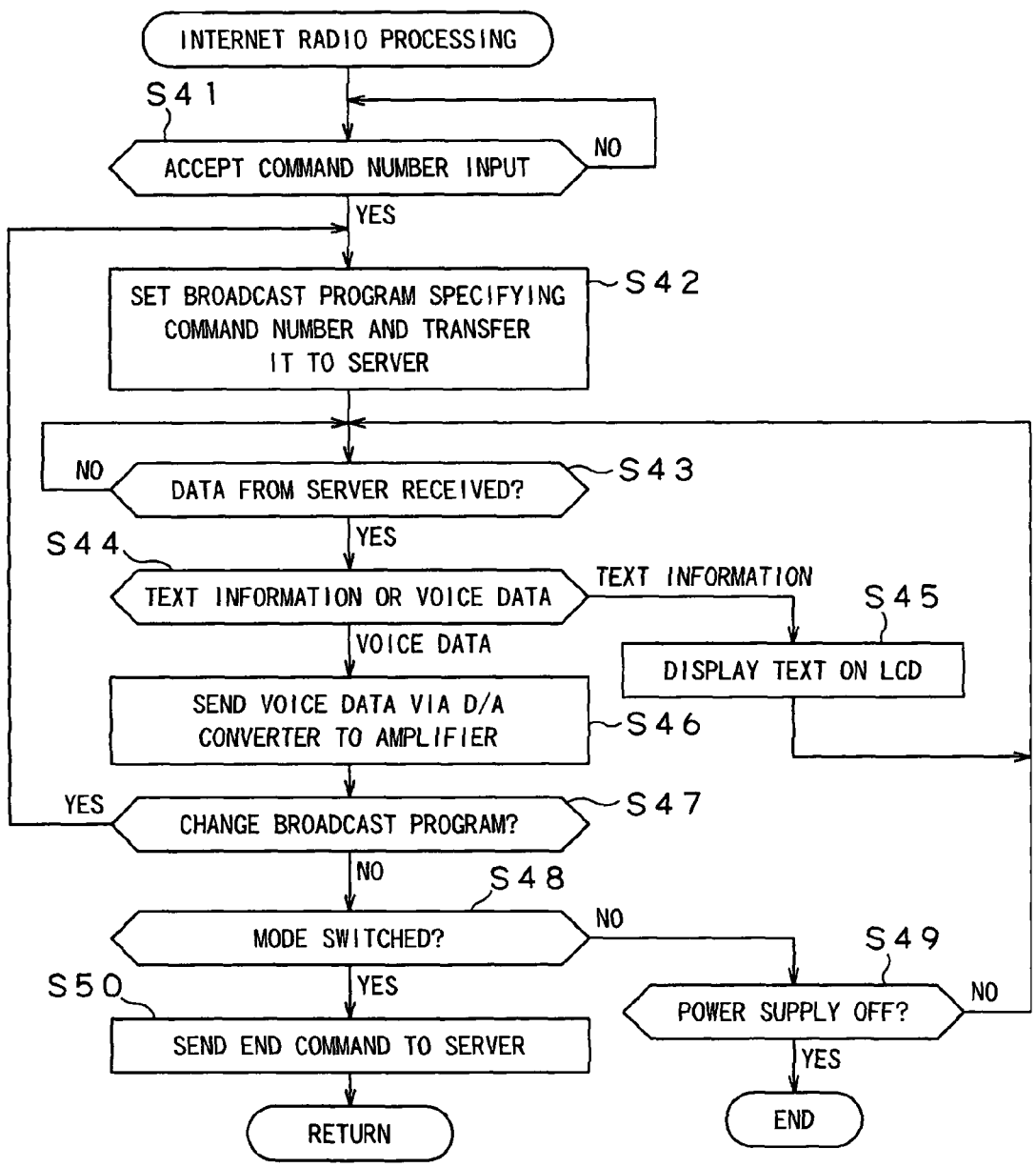
Figure 10:
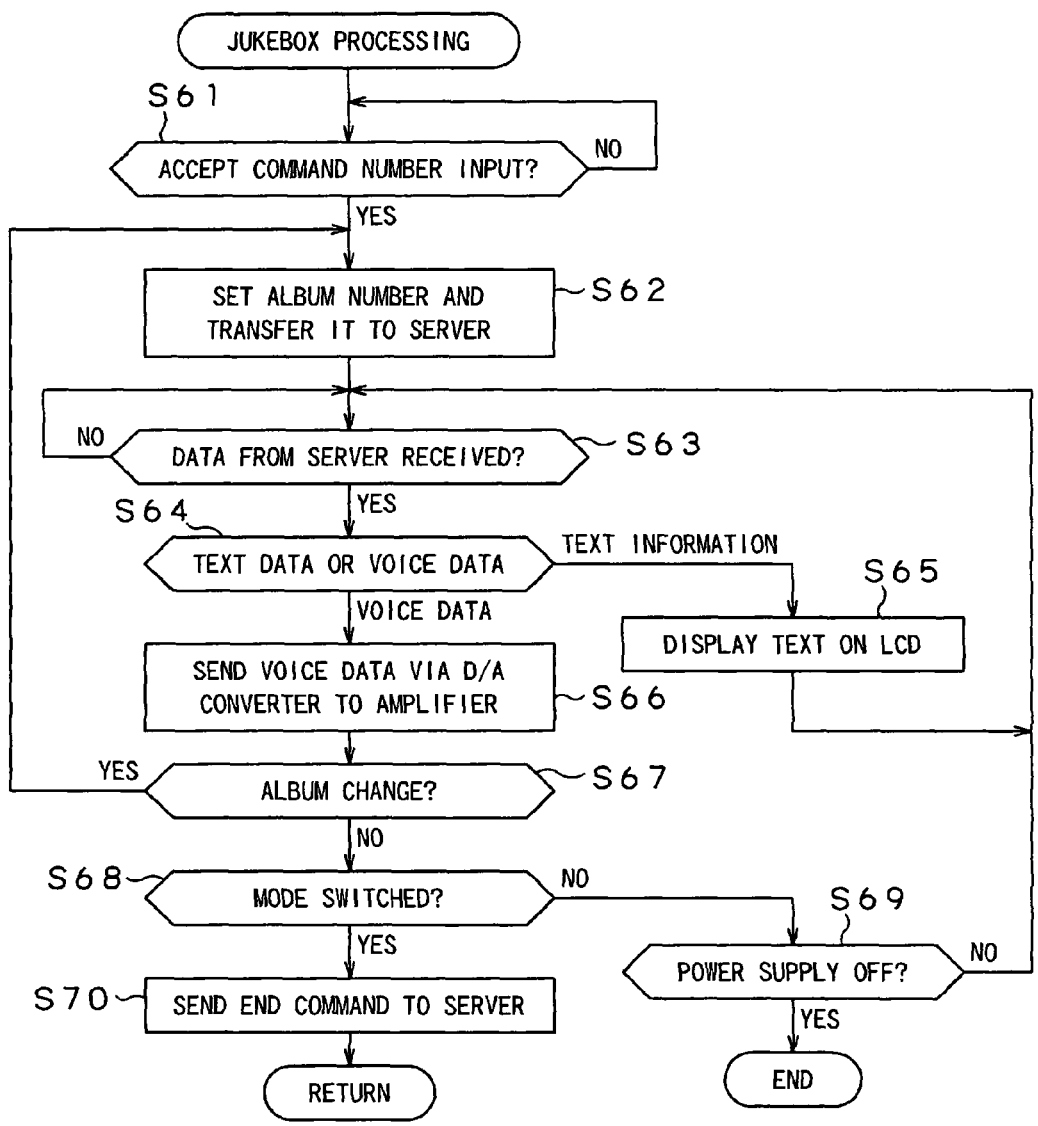
Figure 11:
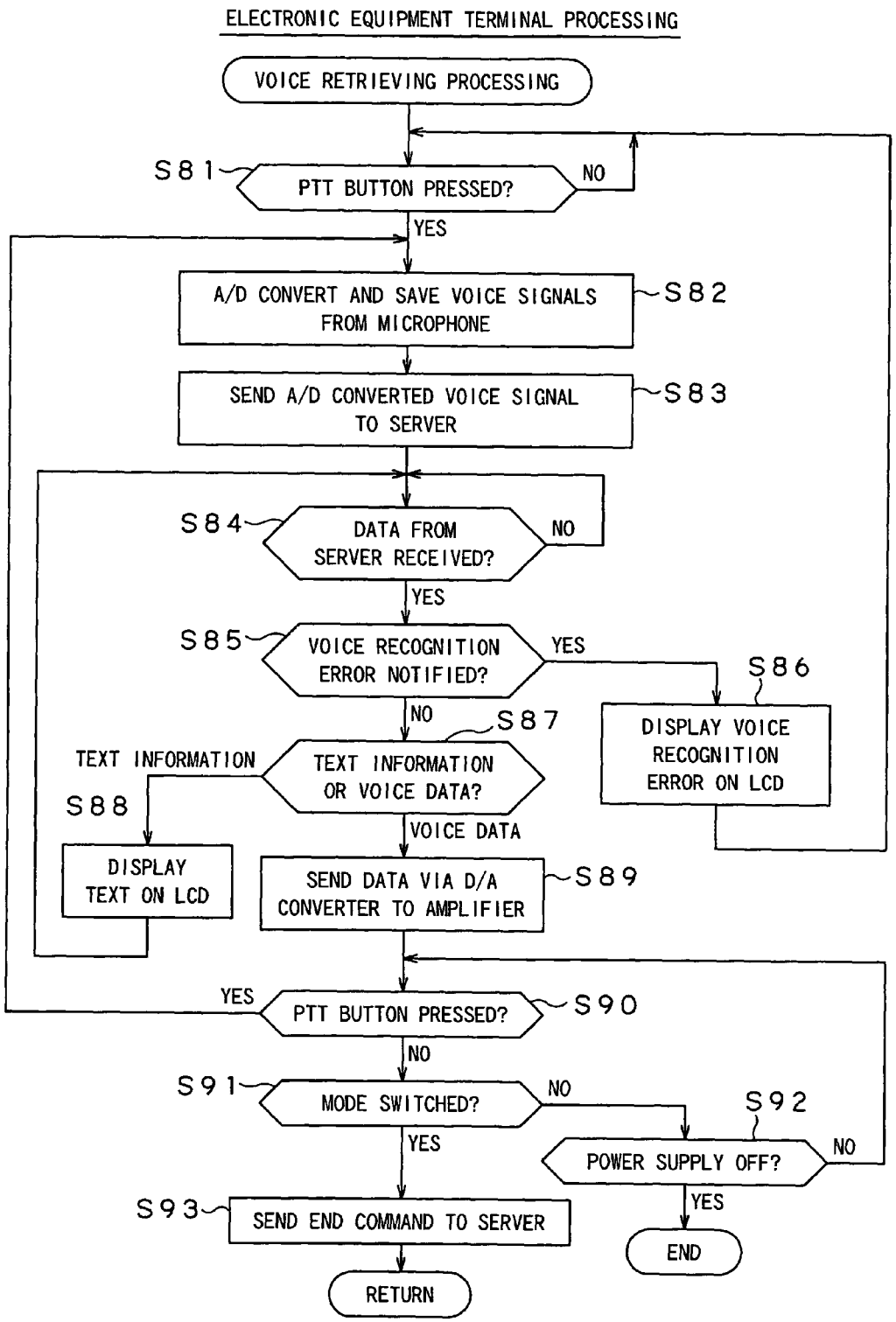

After the step S10 or S11, the CPU 200 of the electronic equipment terminal 2A executes the authentication operations with the PC server 1 (step S31 of FIG. 8). In case of failure in the authentication operations, the CPU executes error processing by displaying that effect on the LCD 213 by way of error processing (step S32). The CPU then returns to the state of the mode prior to the decision of the mode switching operation in the step S2 (step S33).

The CPU 200 then verifies whether or not the mode switching operation has been carried out (step S34). If the mode switching operation has not been made, it is verified whether or not the power supply has been turned off (step S35). If it has been verified that the power supply has not been turned off, the CPU returns to the step S33 to continue the state which prevailed before the mode switching operation in the step S2. If it has been verified that the power supply has been turned off, the processing comes to a close. If it has been verified in the step S34 that the mode switching has been done, the CPU returns to the step S3.

If it is determined in the step S31 that the authentication is all correct, the CPU 200 verifies whether or not the mode commanded for switching is the Internet radio mode (step S36). If it is determined that the mode is the Internet radio mode, the CPU executes the processing routine for the Internet radio mode (step S37). The processing routine for the Internet radio mode will be explained subsequently.

If it is determined in the step S36 that the mode specified for switching is not the Internet radio mode, the CPU 200 verifies whether or not the jukebox mode has been specified (step S38). If it is determined that the jukebox mode has been specified, the CPU executes the processing routine for the jukebox mode (step S39). The processing routine for the jukebox mode will be explained subsequently.

If it is determined in the step S38 that the mode specified for switching is not the jukebox mode, the CPU 200 determines that the voice retrieval mode has been specified and executes the processing routine for the voice retrieving mode (step S40). The processing routine for the voice retrieving mode will be explained subsequently.

If, in the Internet radio mode of step S37, jukebox mode of step S39 and the voice retrieval mode of step S40, it is determined that the mode switching operation has been made, as will be explained subsequently, the CPU reverts to the step S3.

[Processing Routine for Internet Radio Mode]

If the mode has been switched to the Internet radio mode, the CPU 200 of the electronic equipment terminal 2A awaits the inputting of a command number (step S41). In the present embodiment, the command number may be entered either using a number input key provided to the key input operating unit 207 or to the remote controller transmitter 211, or by a command number search, as explained previously.

If it is determined in the step S41 that the command number has been entered either by the number key input or by command number search, the CPU 200 assembles the accepted command number, as transmission data, into a set with the aforementioned server number, and generates a transmission packet in the packet breakdown/generating unit 222, to send the so generated transmission packet to the PC server 1 over the communication interface 221 (step S42).

The PC server 1 identifies the command number to verify that the command is that for the Internet radio. Responsive to the verified result, the PC server 1 accesses the Internet radio station, over the Internet, to receive the contents data of the requested program to decode the so received contents data in the Internet radio decoding unit 107. The PC server 1 packetizes the decoded data of the contents (digital audio signals) to send the so packetized data to the electronic equipment terminal 2A.

If, in the requested program data, there is the text information ancillary to the program names or the program information, as an example, the PC server 1 sends the text information to the electronic equipment terminal 2A.

The CPU 200 of the electronic equipment terminal 2A monitors the reception of the digital data, sent from the PC server 1 (step S43). On verifying that the digital data has been received, the CPU checks to see whether the received digital data is the text information or the audio data from, for example, a packet header (step S44).

If, in the step S43, it is determined that the received digital data is the text information, the CPU 200 converts the text information into display data to display the data on the LCD 213 (step S45). The CPU then returns to the step S43.

If it is determined in the step S44 that the received digital data is the audio data, the CPU transfers the received digital audio data through the I/O port 215 to the D/A converter 216 (step S46). The digital audio signals are converted by this D/A converter 216 into analog audio signals, which analog audio signals are then sent via switching circuit 217 and amplifier 218 to the loudspeaker 219 for audio reproduction.

The CPU 200 then verifies whether or not a command for changing the broadcast program has been made, based on whether or not the command number input by number key input or command number search (change input of the command number) has been made (step S47). If it is determined that the change input of the command number has been made, the CPU reverts to the step S42 to send the change-input command number to the PC server 1 to request the PC server 1 to change the broadcast program of the internet radio.

If it is determined in the step S47 that no change command of the broadcast program has been made, the CPU 200 verifies whether or not the mode switching operation has been done (step S48). If no mode switching operation has been done, the CPU verifies whether or not the power supply has been turned off (step S49). If it is verified that the power supply has not been turned off, the VPU reverts to the step S43 to continue the Internet radio mode. If it is verified that the power supply has been turned off, the processing comes to a close.

If it is determined in the step S48 that the mode switching operation has been done, the CPU sends an access end command to the PC server 1 (step S50) to return to the step S3 of FIG. 6. The access end command may, for example, be a preset command number, such as '0001'.

[Processing Routine of Jukebox Mode]

In the jukebox mode, the CPU 200 waits for the inputting of the command number, as in the case of the Internet radio mode.

If it is determined in the step S61 that the command number has been entered either by the number key input or by command number search, the CPU 200 assembles the accepted command number, as transmission data, into a set with the aforementioned server number, to generate a transmission packet in the packet breakdown/generating unit 222, to send the so generated transmission packet to the PC server 1 over the communication interface 221 (step S62).

The PC server 1 identifies the command number to verify that the command is that for the Internet radio, as will be explained subsequently. Responsive to the verified result, the PC server 1 reads out the contents data (compressed data) of the requested album from the music contents database 109 to expand and decode the contents data in the music contents decoding unit 110. The PC server 1 packetizes the decoded data of the contents (digital audio signals) to send the resulting data to the electronic equipment terminal 2A.

If there is the text information, such as the names of the music airs, as the ancillary information for the requested album contents, the PC server 1 sends the text information to the electronic equipment terminal 2A.

The CPU 200 of the electronic equipment terminal 2A monitors the receipt of the digital data, sent from the PC server 1 (step S63). If receipt of the digital data has been confirmed, the CPU verifies whether the received digital data is the text information or the audio data, from e.g. the packet header (step S64).

If it is determined in the step S64 that the received digital data is the text information, the CPU 200 converts the text information into display data for display on the CPU 213 (step S65). The CPU then reverts to the step S63.

If it is detected in the step S64 that the received digital data is audio data, the received digital audio data is transmitted via I/O port 215 to the D/A converter 216 (step S66). The digital audio signals are converted by this D/A converter 216 into analog audio signals, which are then sent via switching circuit 217 and amplifier 218 to the loudspeaker 219 for audio reproduction.

The CPU 200 then verifies whether or not a command for changing the album has been made, based on whether or not the command number input by number key input or command number search (change input of the command number) has been done (step S67). If it is determined that the change input of the command number has been made, the CPU reverts to the step S42 to send the change-input command number to the PC server 1 to request the PC server 1 to change the album.

If it is determined in the step S67 that there has been no change command of the broadcast program, the CPU 200 verifies whether or not the mode switching operation has been done (step S68). If no mode switching operation has been done, the CPU verifies whether or not the power supply has been turned off (step S69). If it is verified that the power supply has not been turned off, the CPU reverts to the step S63 to continue the jukebox mode. If it is verified that the power supply has been turned off, the processing comes to a close.

If it is determined in the step S68 that the mode switching operation has been done, the CPU sends an access end command to the PC server 1 (step S70) to return to the step S3 of FIG. 6.

[Processing Routine of Voice Retrieval Mode]

First, the CPU 200 verifies whether or not a retrieval command by the user's voice input over the microphone 224 has been entered, based on whether or not the pushbutton for PTT has been pressed (step S81). If it is determined that the retrieval command by the user's voice input has been made, the CPU 200 converts the voice signals from the microphone 224 by the A/D converter 227 into digital signals, which are then stored in a buffer memory in the packet breakdown/ generating unit 222 (step S82).

The packet breakdown/generating unit 222 of the CPU 200 generates a transmission packet, having the so stored voice retrieval command as transmission data, to transmit the so generated transmission packet over the communication interface 221 to the PC server 1 (step S83).

The PC server 1 recognizes the voice retrieval command as voice to identify the contents of the retrieval command. If the contents of the voice retrieval command indicate the broadcasting station and the program of the Internet radio, the PC server 1 accesses the Internet radio station to acquire the contents of the specified broadcasting program to decode the contents by the Internet radio decoding unit 107, as mentioned previously. The PC server 1 packetizes the decoded data of the contents (digital audio signals) to send the resulting data to the electronic equipment terminal 2A.

If the contents of the voice retrieval command specify the album name of the jukebox, the PC server 1 reads out the contents of the specified album from the music contents database 109 to expand and decode the so read out contents in the music contents decoding unit 110. The PC server 1 packetizes the decoded data of the contents (digital audio signals) to send the so packetized data to the electronic equipment terminal 2A.

It should be noted that the voice retrieval command is not limited to the name of the broadcasting station or the program name in the case of the Internet radio or the names of the albums or music airs in the case of the jukebox, directly uttered by the user, but also the aforementioned command number, uttered by the user, as mentioned above. In the latter case, on recognition of the command number by voice recognition, the PC server 1 accordingly refers to the access number management unit 104 to check to see what is requested by the command in question.

If, in the present embodiment, the PC server 1 has failed in the voice recognition, the PC server 1 notifies the electronic equipment terminal of the voice recognition error.

Thus, in the present embodiment, the voice data, the text information as the ancillary information, and occasionally the information on the voice recognition error, are sent in this voice retrieval mode from the PC server 1.

Specifically, the CPU 200 of the electronic equipment terminal 2A monitors the receipt of the digital data, sent from the PC server 1 (step S84). On verifying the receipt of the digital data, it is verified whether or not the digital data is the notification of the error in voice recognition (step S85). It it is determined that the digital data is the notification of the error in voice recognition, such error in voice recognition is displayed in the LCD 213, while the speech indicating the error is radiated from the loudspeaker 219 to notify user of the error (step S86). The CPU 200 then returns to the step S81.

If it is determined in the step S85 that the notification of the error in voice recognition has not been received, the CPU 200 verifies, from e.g. the packet header, whether or not the received digital data is the text information or the audio data (step S87).

If it is verified in the step S87 that the received digital data is the text information, the CPU 200 converts the text information into display data which is then demonstrated on the LCD 213 (step S88). The CPU then returns to the step S84.

If it is determined in the step S87 that the received digital data is the audio data, the CPU sends the received digital audio data through I/O port 215 to the D/A converter 216 (step S89). The digital audio signals are converted by this D/A converter 216 into analog audio signals which are then supplied via switching circuit 217 and amplifier 218 to the loudspeaker 219 for audio reproduction.

The CPU 200 then verifies whether or not a change input of the retrieval command has been issued by the user's voice input from the microphone 224, based on whether or not the pushbutton for PTT has been pressed (step S90). If it is determined that the change input of the retrieval command has been issued, the CPU returns to the step S82 to convert the analog command by the user's input to digital data which is ten stored.

If it is determined in the step S90 that there has been no change input of the voice retrieval command, the CPU 200 checks to see whether or not the mode switching operation has been done (step S91). If it is determined that there has been no mode switching operation, the CPU checks to see whether or not the power supply has been turned off (step S92). If it is determined that the power supply has not been turned off, the CPU reverts to the step S90 and, if otherwise, the processing comes to a close.

If it is determined in the step S91 that the mode switching operation has been made, the CPU sends an access end command to the PC server 1 (step S93) to revert then to the step S3 of FIG. 6.

[Processing Operation of PC Server 1]

Figure 12:
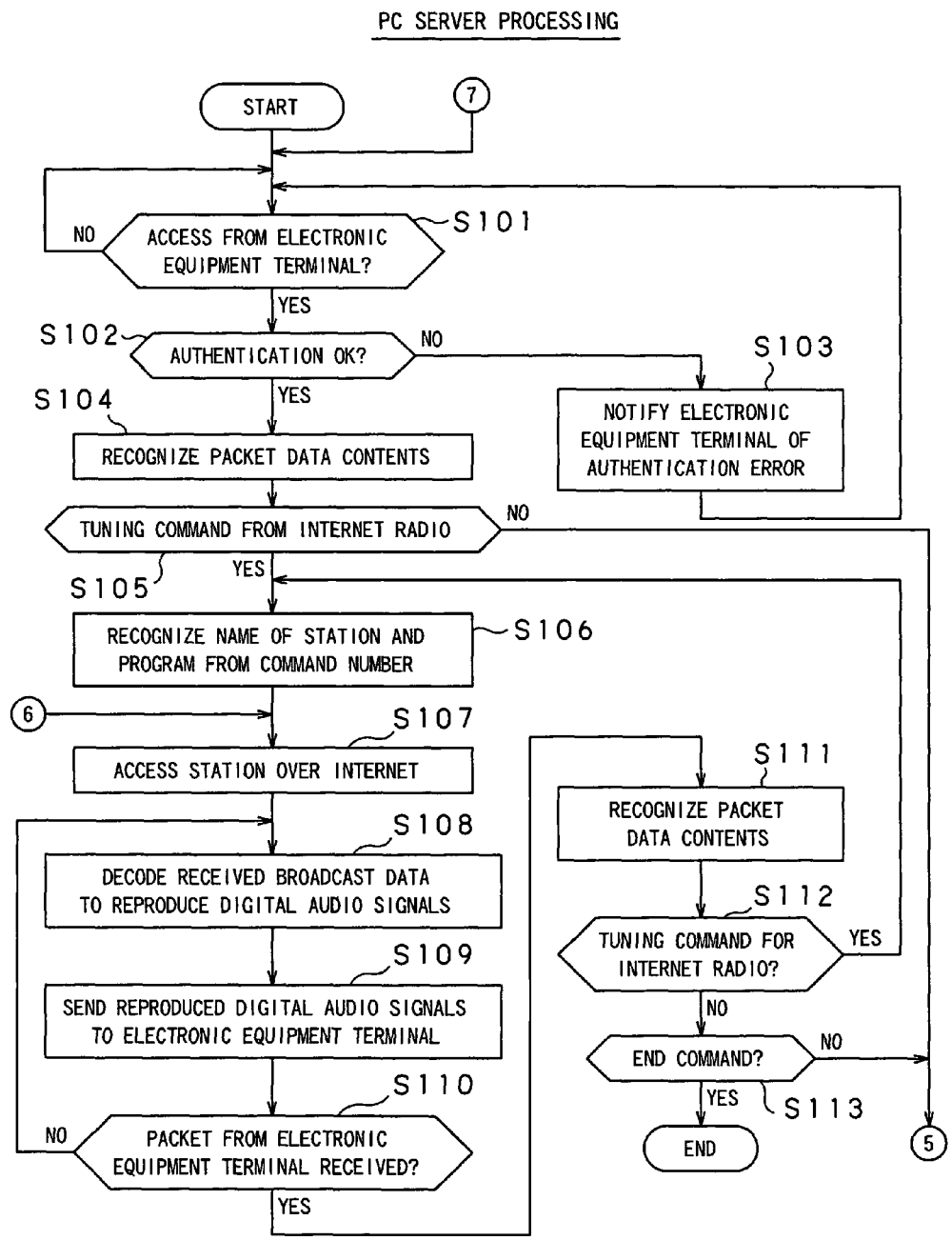
FIG. 12 depicts a portion of a flowchart for illustrating the processing operation in the electronic equipment terminal embodying the present invention.
Figure 13:
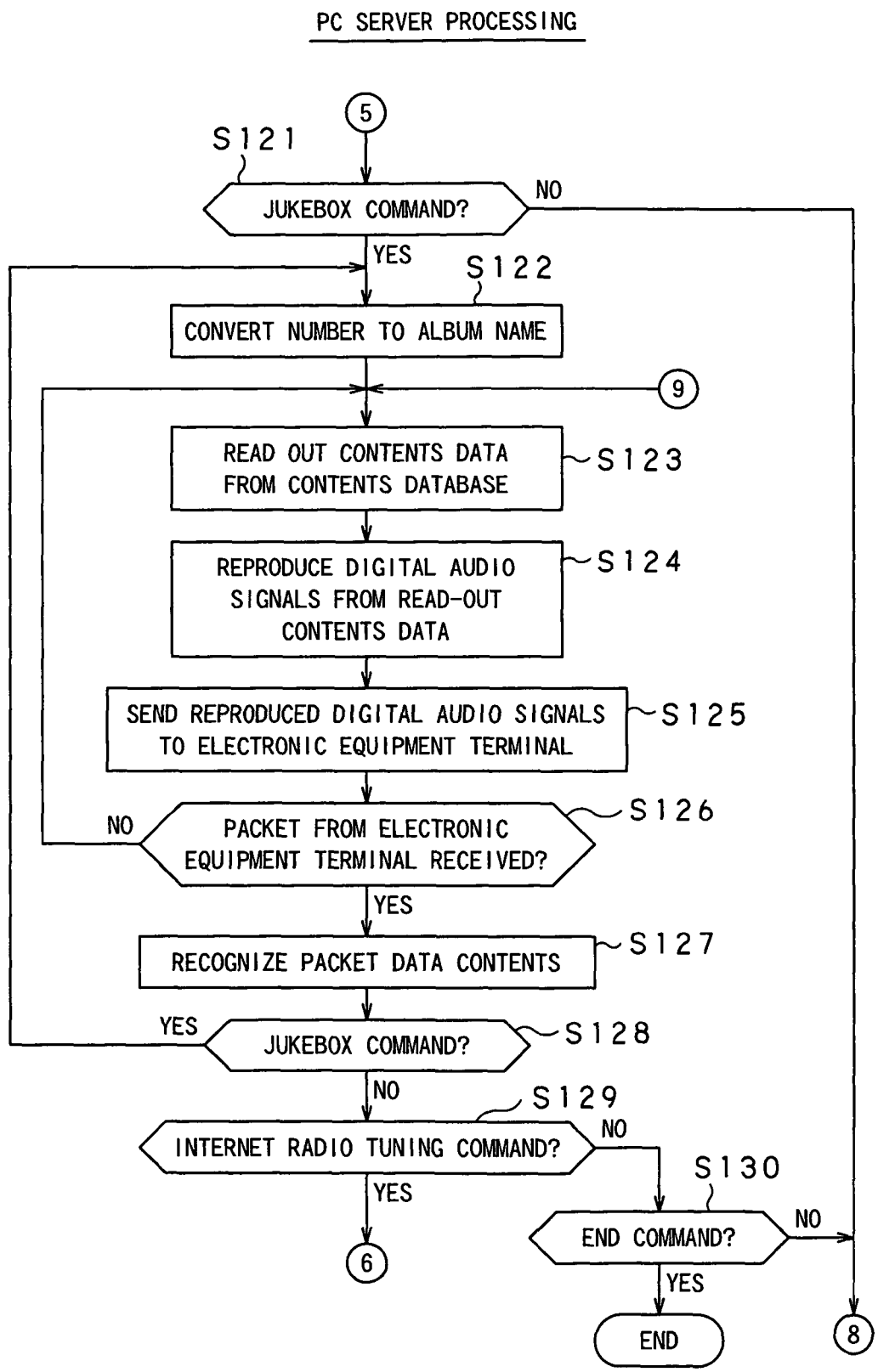
FIGS. 13 and 14 depict respective portions of the flowchart for illustrating the processing operation in the electronic equipment terminal embodying the present invention.
Figure 14:
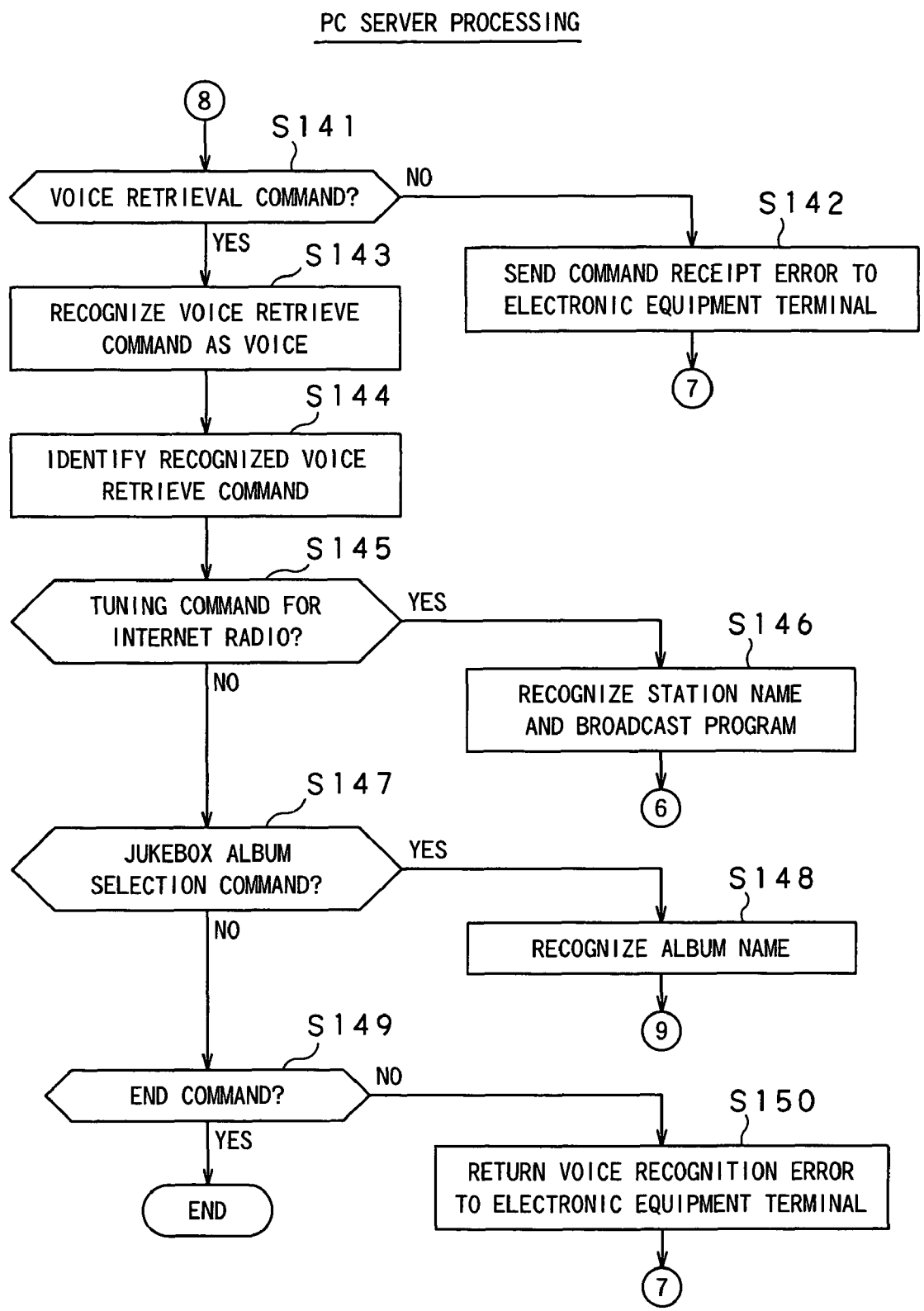
Figure 15:
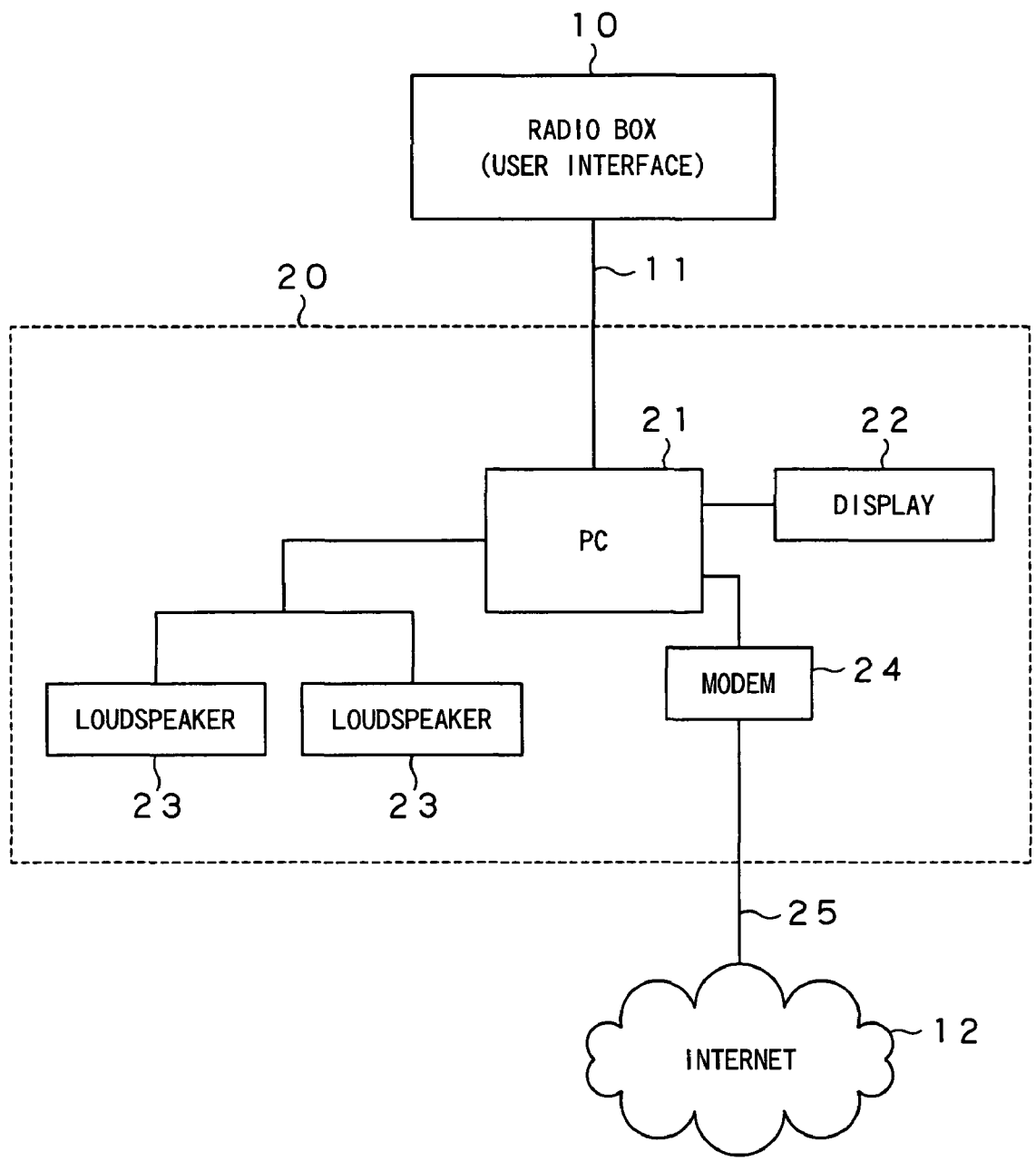
FIG. 15 is a block diagram for illustrating a receiving system for a conventional Internet radio system.

Referring to the flowcharts of FIGS. 12 to 14, the processing operation of the PC server 1 is now explained.

First, the CPU 100 of the PC server 1 waits for the access from the electronic equipment terminal (step S101). If it is determined that there has been an access from the electronic equipment terminal, the CPU executes authentication operations depending on whether or not the accessing electronic equipment terminal is the registered terminal (step S102).

If it has been determined in the step S102 that the accessing electronic equipment terminal is not registered and has not been authenticated, the CPU 100 notifies the accessing electronic equipment terminal of the authentication error (step S103).

If it has been determined in the step S102 that the accessing electronic equipment terminal has been authenticated, the CPU 100 receives the packet from the electronic equipment terminal and breaks down the packet in the packet breakdown/packet generating unit 106 to recognize the data contents (step S104).

The CPU 100 then verifies whether or not the data sent thereto is the command number requesting the tuning of the Internet radio (step S105). If the data is the command number requesting the tuning of the Internet radio, the CPU refers to the access number management unit 104 to recognize the name of the broadcasting station and the broadcast program (step S106). The CPU then reads out the URL address for the so recognized broadcasting station and program from the access number management unit 104 to access the address over the Internet 12 (step S107).

The CPU 100 then receives the broadcast program contents, sent from the Internet radio station, and decodes the contents by the Internet radio decoding unit 107 to reproduce the digital audio signals (step S108). The CPU 100 commands the packet breakdown/packet generating unit 106 to packetize the so reproduced digital audio signals, and exercises control to transmit the generated packet over the communication interface 105 to the accessing electronic equipment terminal (step S109).

The CPU 100 verifies whether or not a new packet has been received from the electronic equipment terminal (step S110). If no new packet has been received, the CPU reverts to the step S108. If it is verified in the step S110 that a new packet has been received from the electronic equipment terminal, the CPU 100 causes the packet breakdown/packet generating unit 106 to break down the newly received packet to recognize the data contents (step S111).

The CPU 100 verifies whether or not the data sent thereto is a command number requesting the station selection of the Internet radio (step S112). If the data is the command number requesting the station selection of the Internet radio, the CPU reverts to the step S106 to recognize the name of the broadcasting station and the broadcast program from the command number to acquire the name of the new broadcasting station and the contents of the new broadcast program from the Internet 12 as described above.

If it is determined in the step S112 that the data is not the command number requesting the station selection of the Internet radio, the CPU checks to see whether or not the data is the end command (step S113). If the data is the end command, the CPU terminates the communication with the electronic equipment terminal to terminate this processing routine. If it is determined that the data is not the end command, the CPU transfers to a step S121 of FIG. 13. If it is determined in the step S105 that the data sent is not the command number requesting the tuning of the Internet radio, the CPU similarly transfers to a step S121 of FIG. 13.

In the step S121 of FIG. 13, it is checked whether or not the sent data is the album selection command of the jukebox. If the sent data is the album selection command of the jukebox, the CPU refers to the access number management unit 104 to recognize the album name from the command number (step S122) to read out the contents of the so recognized album name from the music contents database 109 (step S123).

The CPU 100 then causes the music contents decoding unit 110 to decode the music data, read out from the music contents database 109, to reproduce the digital audio signals (step S124). The CPU 100 commands the packet breakdown/packet generating unit 106 to packetize the so reproduced digital audio signals, while performing control to send the so generated packet over the communication interface 105 to the accessing electronic equipment terminal (step S126).

The CPU 100 then verifies whether or not a new packet has been received from the electronic equipment terminal (step S126). If it is determined that no new packet has been received, the CPU reverts to the step S123. If it is determined in the step S126 that a new packet has been received from the electronic equipment terminal, the CPU 100 breaks down the newly received packet in the packet breakdown/packet generating unit 106 to recognize the data contents (step S127).

The CPU 100 verifies whether or not the data sent thereto is the command number specifying the album of the jukebox (step S128). If the data is the command number specifying the album of the jukebox, the CPU reverts to the step S122 to recognize the album name from the command number to read out the contents of the new album name from the music contents database 109, as explained previously.

If it is determined in the step S128 that the data sent thereto is not the command number specifying the new album name of the jukebox, the CPU verifies whether or not the data so sent is the command number requesting the tuning of the Internet radio (step S129). If the data is the command number requesting the tuning of the Internet radio, the CPU returns to the step S106 of FIG. 12 to recognize the name of the broadcasting station and the broadcast program from the command number to acquire the new name of the broadcasting station and the contents of the program from the Internet, as explained previously.

If it is determined in the step S112 that the sent data is not the command number requesting the tuning of the Internet radio, the CPU 100 verifies whether or not the data is the end command (step S130). If the data sent is the end command, the CPU causes the communication with the electronic equipment terminal to end up with the processing routine. If otherwise, the CPU proceeds to the step S141 of FIG. 14. If it is determined in the step S121 that the data sent is not the command number specifying the album name of the jukebox, the CPU similarly proceeds to the step S141 of FIG. 14.

In the step S141 of FIG. 14, the CPU 100 verifies whether or not the data sent is the voice retrieval command. If it is determined that the data is not the voice retrieval command, the CPU sends a command receipt error to the electronic equipment terminal (step S142). The CPU then returns to the step S101 of FIG. 12.

If it is determined that the data sent is the voice retrieval command, the CPU 100 sends the information of the voice retrieval command to the voice recognition unit 108 to effect voice recognition (step S143) to recognize what is the recognized voice retrieval command (step S144).

The CPU 100 verifies whether or not the voice retrieval command is the command requesting the tuning of the Internet radio (step S145). If it is determined that the voice retrieval command is the command requesting the tuning of the Internet radio, the CPU recognizes the name of the broadcasting station and the broadcast program (step S146). The CPU reverts to the step S107 of FIG. 12 to read out the URL address associated with the broadcasting station and the broadcast program, as recognized, from the access number management unit 104, in order to access the address over the Internet 12.

If it is determined that the voice retrieval command is not the command requesting the tuning of the Internet radio, the CPU verifies whether or not the voice retrieval command is a command for jukebox album selection (step S147). If it is determined that the voice retrieval command is the command for selection of the jukebox album, the CPU recognizes the album name (step S148). The CPU 100 reverts to the step S123 of FIG. 13 where the CPU reads out the contents of the recognized album name from the music contents database 109.

If it is determined in the step S147 that the voice retrieval command is not a command requesting the tuning of the Internet radio, the CPU 100 verifies whether or not the command is the end command (step S149). If the voice retrieval command is not the end command, the CPU returns a voice recognition error to the electronic equipment terminal (step S1150). If it is determined in the step S149 that the voice retrieval command is the end command, the processing routine is terminated.

In the present embodiment, described above, in which, if a command is sent from the electronic equipment terminal to the PC server, decoded data of the contents (digital audio signals) are sent from the PC server, the structure of the electronic equipment terminal may be simplified appreciably.

That is, the electronic equipment terminal may be constructed with a simpler structure not having the accessing function to the Internet 12 nor the function of decoding the contents data and having only the function of communication with the PC server, the function of requesting a command to the PC server and the function of D/A conversion of the decoded contents data from the PC server for audio reproduction.

In the present embodiment, the electronic equipment terminal may be installed in any place, provided that the electronic equipment terminal is connected to the PC server over the network, so that e.g. the Internet radio may be exploited by providing an electronic equipment terminal in each room as the structure of hone network centered about the PC server.

[OTHER EMBODIMENTS]

In the above-described embodiments, the voice retrieval command is a command requesting the contents of the Internet radio or the jukebox. However, if the PC server 1 includes a database other than the music contents database, the voice retrieval command may also be the command for retrieving the information stored in such other database.

For example, the PC server 1 may be provided with a dictionary database or an encyclopedia database. Such database may be the database stored in e.g. an optical disc, data acquired from the Internet and stored in a memory, or may be a preexisting database to which data has been added from the Internet.

In this case, a keyword for retrieval is entered by voice as a voice retrieval command in the electronic equipment terminal. The voice retrieval command, composed of the keyword, is sent to the PC server 1.

In the present modification, it is possible to make retrieval for items desired by the user, based on the retrieval keyword by the voice retrieval command, from the dictionary database or the encyclopedia database, in addition to the program retrieval for the Internet radio and to the album retrieval for the jukebox described above.

In such case, if the retrieved results in the PC server 1 are text data (letter/character data), these may be directly sent from the PC server 1 to the electronic equipment terminal. Alternatively, the PC server 1 may be provided with voice synthesizing means and the text data of the retrieved results may be changed by the voice synthesizing means into voice data which may then be sent to the electronic equipment terminal.

If the text data of the retrieved results are changed into voice data which then is sent to the electronic equipment terminal, the electronic equipment terminal does not have to be provided with a display of a large format for demonstrating the text generated from the text data, so that the electronic equipment terminal may be constructed inexpensively.

In the above-described embodiment, a mode switching key is actuated in advance of the inputting of the command number. It is however possible to simplify the inputting by directly inputting the aforementioned command number, described previously with reference to FIG. 3, with the Internet radio and the jukebox being then of the common PC server access mode.

In the case of the voice retrieval mode, the mode switching operation to the voice retrieval mode may be omitted if the mode being the voice retrieval mode is recognized on pushing the pushbutton for PTT.

In the foregoing explanation, the contents data are audio data. However, the present invention is similarly applicable to a case wherein the contents data are video data or the video/audio data.

If the video data is contained in the contents data, the electronic equipment terminal may be provided with video display means, such as CRT (cathode ray tube) or LCD, in which case the electronic equipment terminal sends a command to the PC server and, as a reply to the command, receives digital video data to convert the so received digital video data into analog video signals which may then be displayed on a picture frame of video display means.

In the foregoing explanation of the preferred embodiments, the electronic equipment terminal is provided with a function for communication in which the pre-existing electronic equipment terminals are connected in a LAN style. However, the electronic equipment terminals are not limited to this configuration.

For example, the electronic equipment terminals may be of a simpler structure provided only with the function of communication over LAN, means for inputting a command, audio reproducing means and/or video display means. If, in such case, a microphone is used as command inputting means, and the speech is recognized by the PC server, the electronic equipment terminal may be simplified in structure. Additionally, the user may enjoy the contents provided by e.g. Internet radio without having to perform any key operations.

What is claimed is:

1. A network system comprising:
   a server apparatus; and
   an electronic equipment terminal interconnected over a network, wherein said electronic equipment terminal includes:
   a terminal transmitting unit configured to send a command requesting contents to said server apparatus over said network; and
   a reproducing unit configured to reproduce digital data of said contents sent from said server apparatus over said network; and wherein said server apparatus includes
   a server transmitting unit which, on receipt of said command from said electronic equipment terminal, transmits digital data of said contents requested over said network to said electronic equipment terminal,
   whereby:
   said command specifies contents stored in a database or broadcast contents, said command comprises a server number, an album number and a track number,
   when said command specifies broadcast contents, said album number indicates a broadcasting station, and
   the contents stored in the database and the broadcast contents being demarcated by album numbers such that a first range of the album numbers indicates the contents stored in the database and a second range of the album numbers indicates the broadcast contents.

2. The network system according to claim 1 wherein said server apparatus further includes
   a storage unit for storing digital data of contents; and wherein
   the digital data of the contents are read out from said storage unit in response to said command from said electronic equipment terminal and transmitted to said electronic equipment terminal.

3. The network system according to claim 2 wherein said server apparatus further includes
   a decoding unit configured to decode compressed digital data wherein
   the compressed digital data stored in said storage unit is decoded by said decoding unit and the decoded digital data are transmitted to said electronic equipment terminal.

4. The network system according to claim 1 wherein said server apparatus further includes
   a data receiving unit configured to acquire the digital data of said contents over said network in response to said command from said electronic equipment terminal wherein
   the digital data acquired are transmitted to said electronic equipment terminal over said network.

5. The network system according to claim 4 wherein said server apparatus further includes a decoding unit configured to decode the compressed digital data wherein
   compressed digital data, acquired over said network, is decoded by said decoding unit, and the decoded digital data is sent to said electronic equipment terminal.

6. The network system according to claim 1 wherein said server apparatus further includes means configured to transmit ancillary information pertinent to said contents to said electronic equipment terminal, and wherein
   said electronic equipment terminal receives the ancillary information pertinent to said contents and supplies the received ancillary information to a user.

7. The network system according to claim 1 wherein said electronic equipment terminal further includes a receiving unit configured to receive broadcast electrical waves and to take out broadcast contents therefrom and wherein, when a receiving function of said receiving unit is selected by said electronic equipment terminal, a circuit unit configured to send out a command and to receive data over said network is set to one of a power off state and a standby state.

8. The network system according to claim 1 wherein the command sent from said electronic equipment terminal to said server apparatus is composed of server identifying information for identifying the server apparatus and contents identifying information for identifying the contents.

9. An electronic equipment terminal connected to a server apparatus over a network, comprising:
   a terminal transmitting unit configured to transmit a command requesting contents from said server apparatus over said network, wherein the terminal transmitting unit comprises a modem; and
   a reproducing unit configured to reproduce digital data of said contents sent from said server apparatus over said network,
   whereby:
      said command specifies contents stored in a database or broadcast contents, said command comprises a server number, an album number and a track number,
      when said command specifies broadcast contents, said album number indicates a broadcasting station, and
      the contents stored in the database and the broadcast contents being demarcated by album numbers such that a first range of the album numbers indicates the contents stored in the database and a second range of the album numbers indicates the broadcast contents.

10. The electronic equipment terminal according to claim 9 further comprising a receiving unit for receiving broadcast electrical waves and to take out broadcast contents wherein
   when a receiving function of said receiving unit is selected, a circuit unit configured to send out a command and to receive data over said network is set to one of a power off state and a standby state.

11. A server apparatus connected to an electronic equipment terminal over a network, comprising:
   a server transmitting unit which, when a command requesting contents from said electronic equipment terminal, transmits digital data of said contents to said electronic equipment terminal over said network, wherein a server transmitting unit comprises a modem;
   whereby:
      said command specifies contents stored in a database or broadcast contents, said command comprises a server number, an album number and a track number,
      when said command specifies broadcast contents, said album number indicates a broadcasting station, and
      the contents stored in the database and the broadcast contents being demarcated by album numbers such that a first range of the album numbers indicates the contents stored in the database and a second range of the album numbers indicates the broadcast contents.

12. The server apparatus according to claim 11 further comprising
   a storage unit configured to store the digital data of said contents, wherein
   the digital data of said contents are read out from said storage unit in response to said command from said electronic equipment terminal and transmitted to said electronic equipment terminal.

13. The server apparatus according to claim 12 further comprising
   a decoding unit configured to decode compressed digital data, wherein
   the compressed digital data, stored in said storage unit, is decoded in said decoding unit and the decoded digital data is sent to said electronic equipment terminal.

14. The server apparatus according to claim 11 further comprising
   a data receiving unit configured to acquire the digital data of said contents over said network in response to said command from said electronic equipment terminal, wherein
   the digital data acquired by said data receiving unit is transmitted over said network to said electronic equipment terminal.

15. The server apparatus according to claim 14 further comprising
   a decoding unit configured to decode compressed digital data, wherein
   the compressed digital data, acquired over said network, is decoded by said decoding unit and the decoded digital data is sent to said electronic equipment terminal.

16. The server apparatus according to claim 11 wherein ancillary information pertinent to the contents is sent along with the digital data of said contents to said electronic equipment terminal.

17. A method for distributing and reproducing contents comprising:
- a step of transmitting a command requesting contents to a server apparatus from an electronic equipment terminal over a network;
- a step of decoding compressed data of said contents, on receipt of said command from said electronic equipment terminal, to generate digital data of said contents;
- a step of said server apparatus transmitting the digital data of said contents acquired on decoding by said step of decoding to said electronic equipment terminal over said network; and
- a step of said electronic equipment terminal on receipt of the digital data of said contents reproducing said digital data of said contents, whereby:
- said command specifies contents stored in a database or broadcast contents, said command comprises a server number, an album number and a track number,
- when said command specifies broadcast contents, said album number indicates a broadcasting station, and
- the contents stored in the database and the broadcast contents being demarcated by album numbers such that a first range of the album numbers indicates the contents stored in the database and a second range of the album numbers indicates the broadcast contents.

18. The method for distributing and reproducing contents according to claim 17 further comprising
- a step of acquiring the compressed data of said contents over said network;
- the compressed data of said contents acquired being decoded by said decoding step to generate the digital data of said contents.

* * * * *